US012596414B2

(12) United States Patent
Vichare et al.

(10) Patent No.: US 12,596,414 B2
(45) Date of Patent: Apr. 7, 2026

(54) METHOD AND APPARATUS FOR CONTEXTUAL SWITCHING BETWEEN INFORMATION HANDLING SYSTEM COOLING SYSTEMS

(71) Applicant: Dell Products, LP, Round Rock, TX (US)

(72) Inventors: Nikhil M. Vichare, Austin, TX (US); Travis C. North, Cedar Park, TX (US); Mitchell A. Markow, Hutto, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 568 days.

(21) Appl. No.: 18/104,244

(22) Filed: Jan. 31, 2023

(65) Prior Publication Data

US 2024/0258610 A1      Aug. 1, 2024

(51) Int. Cl.
*G06F 1/20* (2006.01)

(52) U.S. Cl.
CPC .............. *G06F 1/206* (2013.01); *G06F 1/203* (2013.01)

(58) Field of Classification Search
CPC ...... G06F 1/203; G06F 1/206; H01M 10/613; H01M 10/6563
USPC ........................................................ 700/300
See application file for complete search history.

(56) References Cited

U.S. PATENT DOCUMENTS

| | | | |
|---|---|---|---|
| 7,545,640 B2 | 6/2009 | Fisher | |
| 8,467,168 B2 | 6/2013 | Honer | |
| 8,508,908 B2 | 8/2013 | Jewell-Larsen | |
| 8,807,204 B2 | 8/2014 | June | |
| 2005/0214180 A1 | 9/2005 | Joannou | |
| 2010/0037886 A1 | 2/2010 | Krichtafovitch | |
| 2010/0051709 A1 | 3/2010 | Krichtafovitch | |
| 2010/0108291 A1* | 5/2010 | Onnerud ................. | G06F 1/203 |
| | | | 165/80.2 |
| 2011/0036552 A1 | 2/2011 | Lu | |
| 2011/0149252 A1 | 6/2011 | Schwiebert | |
| 2011/0261499 A1 | 10/2011 | Hizer | |

(Continued)

FOREIGN PATENT DOCUMENTS

| | | |
|---|---|---|
| WO | 2007/112763 A1 | 10/2007 |
| WO | 2009/131980 A2 | 10/2009 |

(Continued)

*Primary Examiner* — Chun Cao
(74) *Attorney, Agent, or Firm* — Prol Intellectual Property Law, PLLC; H. Kenneth Prol

(57) ABSTRACT

An information handling system includes a hardware processor, memory device, power system, and an ion emitter/collector blower cooling system with an ion emitter/collector blower, having an ion emitter and an ion collector, and a cooling fan, where an ionic driving circuit operatively couples high voltage to the ion emitter to create charged ions that generate an airflow along a voltage field to the ion collector. The information handling system further includes a hardware embedded controller to execute code instructions of a contextual cooling system switching system, the contextual cooling device switching system operating the ion emitter/collector blower and cooling fan based on plurality of contextual inputs including characterizing workload values under which the information handling system is being operated by the user that are input into a trained machine learning algorithm to generate instructions when to activate ion emitter/collector blower and cooling fan.

20 Claims, 7 Drawing Sheets

(56) References Cited

U.S. PATENT DOCUMENTS

| | | | |
|---|---|---|---|
| 2011/0292593 A1* | 12/2011 | June | G06F 1/206 |
| | | | 361/679.48 |
| 2012/0007742 A1 | 1/2012 | Gooch | |
| 2012/0008248 A1 | 1/2012 | Sawyer | |
| 2012/0057356 A1 | 3/2012 | Hizer | |
| 2012/0205079 A1 | 8/2012 | Jewell-Larsen | |
| 2012/0268857 A1 | 10/2012 | Jewell-Larsen | |
| 2013/0021715 A1 | 1/2013 | Jewell-Larsen | |
| 2013/0056241 A1 | 3/2013 | Gao | |
| 2013/0075382 A1 | 3/2013 | Roy | |
| 2016/0265856 A1 | 9/2016 | Saveliev | |
| 2024/0134428 A1* | 4/2024 | North | G06F 1/203 |
| 2024/0142942 A1* | 5/2024 | North | G06F 1/203 |

FOREIGN PATENT DOCUMENTS

| | | |
|---|---|---|
| WO | 2011/149667 A1 | 12/2011 |
| WO | 2012/006361 A2 | 1/2012 |

* cited by examiner

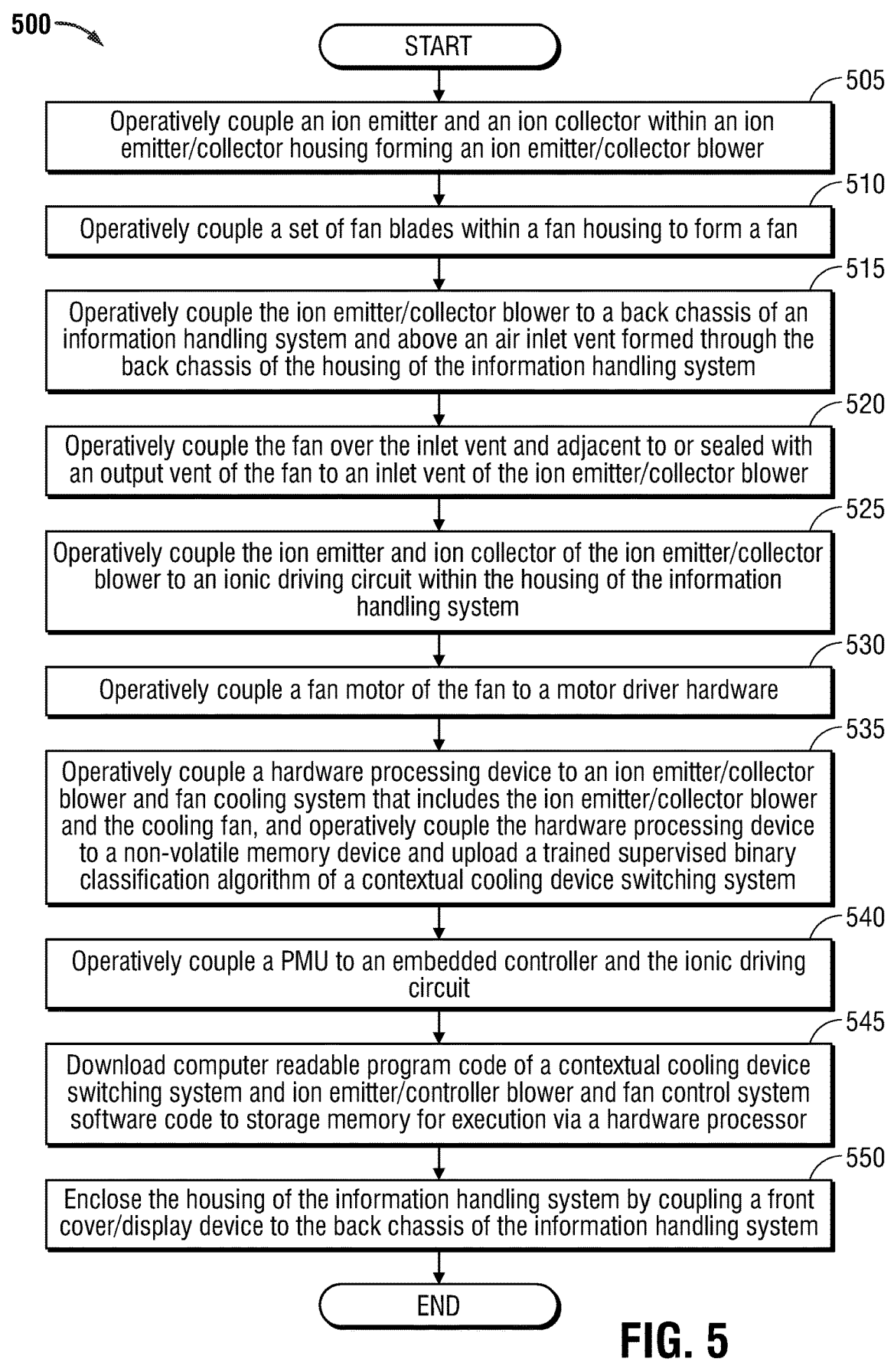

500

START

505

Operatively couple an ion emitter and an ion collector within an ion emitter/collector housing forming an ion emitter/collector blower

510

Operatively couple a set of fan blades within a fan housing to form a fan

515

Operatively couple the ion emitter/collector blower to a back chassis of an information handling system and above an air inlet vent formed through the back chassis of the housing of the information handling system

520

Operatively couple the fan over the inlet vent and adjacent to or sealed with an output vent of the fan to an inlet vent of the ion emitter/collector blower

525

Operatively couple the ion emitter and ion collector of the ion emitter/collector blower to an ionic driving circuit within the housing of the information handling system

530

Operatively couple a fan motor of the fan to a motor driver hardware

535

Operatively couple a hardware processing device to an ion emitter/collector blower and fan cooling system that includes the ion emitter/collector blower and the cooling fan, and operatively couple the hardware processing device to a non-volatile memory device and upload a trained supervised binary classification algorithm of a contextual cooling device switching system

540

Operatively couple a PMU to an embedded controller and the ionic driving circuit

545

Download computer readable program code of a contextual cooling device switching system and ion emitter/controller blower and fan control system software code to storage memory for execution via a hardware processor

550

Enclose the housing of the information handling system by coupling a front cover/display device to the back chassis of the information handling system

END

FIG. 5

METHOD AND APPARATUS FOR CONTEXTUAL SWITCHING BETWEEN INFORMATION HANDLING SYSTEM COOLING SYSTEMS

FIELD OF THE DISCLOSURE

The present disclosure generally relates to cooling systems for information handling system. The present disclosure more specifically relates to controlling an ion emitter/collector blower cooling system and/or cooling fan used to cool an information handling system using machine learning.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Under various operating conditions, especially high-performance conditions, information handling systems may generate heat which, if not mitigated, may affect performance. The information handling system may thus include a cooling system used to cool hardware therein such as a hardware processing device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a block diagram of a method of manufacture for an information handling system with ion emitter/collector blower and cooling fan with a contextual cooling device switching system according to an embodiment of the present disclosure.

The use of the same reference symbols in different drawings may indicate similar or identical items.

DETAILED DESCRIPTION OF THE DRAWINGS

Figure 1A:
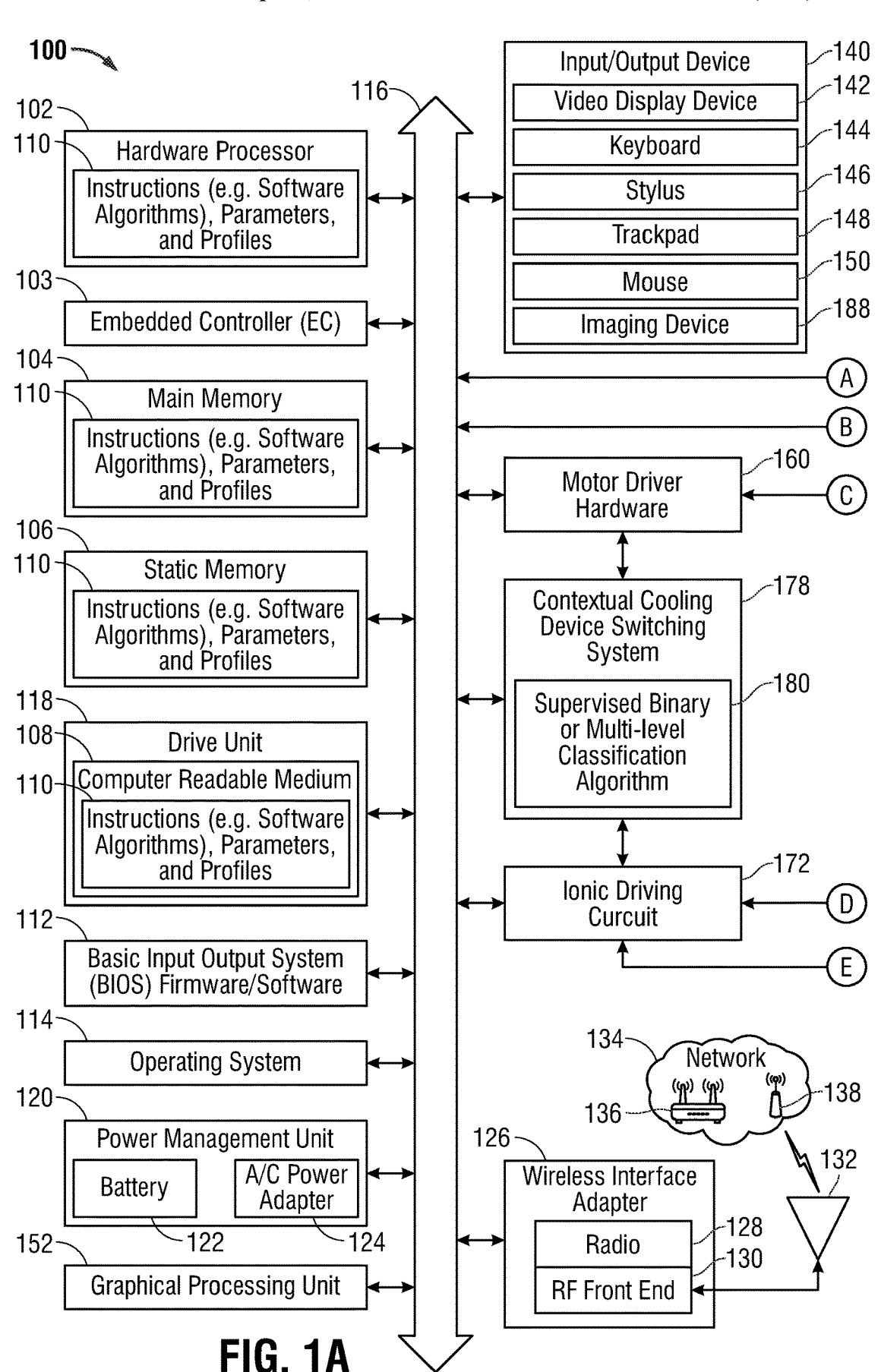
FIGS. 1A and 1B is a block diagram of an information handling system including an ion emitter/collector blower cooling system with an ion emitter/collector blower and a cooling fan and a contextual cooling device switching system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems operate to provide computing, data storage, and application resources among other computing resources. The hardware used to provide these resources to the user consume electricity. As a result of the consumption of this electricity, heat is produced within the housing or other structures used to house the hardware. Some information handling systems include a cooling fan used to blow heat from within the housing to a vent to vent the heated air from within the housing. However, these fans may create a higher degree of noise that may interfere with the use of the information handling system especially when the fan speed is increased due to increased power consumption and a resulting increase in temperature within the housing. Still further, look-up tables or other software or firmware executed by a hardware processor may be used to control the speed of rotation of the fan may only react to detected increases in temperature and do not accommodate for anticipated contexts under which the information handling system is operated under.

The present specification describes an information handling system that includes a hardware processor, memory device, and a power management unit (PMU) to provide power to the hardware processor and memory device. The information handling system further includes a fan and fan motor operatively coupled to a motor driver hardware operated by the hardware processor. The information handling system further includes an ion emitter/collector blower cooling system includes. In an embodiment, the ion emitter/collector blower includes an ion emitter and an ion collector placed in fluidic series. In an embodiment, the ion emitter and ion collector are placed in series with the fan. An ionic driving is circuit operatively coupled to the ion emitter via a high voltage to ionize gases at the ion emitter/collector blower to create charged ions that generate an airflow along a voltage field to and through the ion collector.

The information handling system, in an embodiment, further includes a hardware embedded controller to execute code instructions of a contextual cooling system switching system. The contextual cooling device switching system operates the ion emitter/collector blower and cooling fan based on a context under which the information handling system is being operated by the user and characterizing workload values during ongoing and predicted future operation.

The execution of the contextual cooling device switching system by the hardware processor such as the embedded controller includes, in an embodiment, the use of a supervised binary or multi-level classification algorithm that accommodates for the context under which the information handling system is being operated by the user and characterizing workload values. The contextual cooling device switching system may receive input describing the context under which the information handling system is being operated by the user and input characterizing workload values. With these inputs, machine learning with the contextual cooling device switching system may predictively adjust operation of an ion emitter/collector blower or cooling fan depending on anticipated cooling needs and balance ambient noise reduction where available.

Figure 1B:
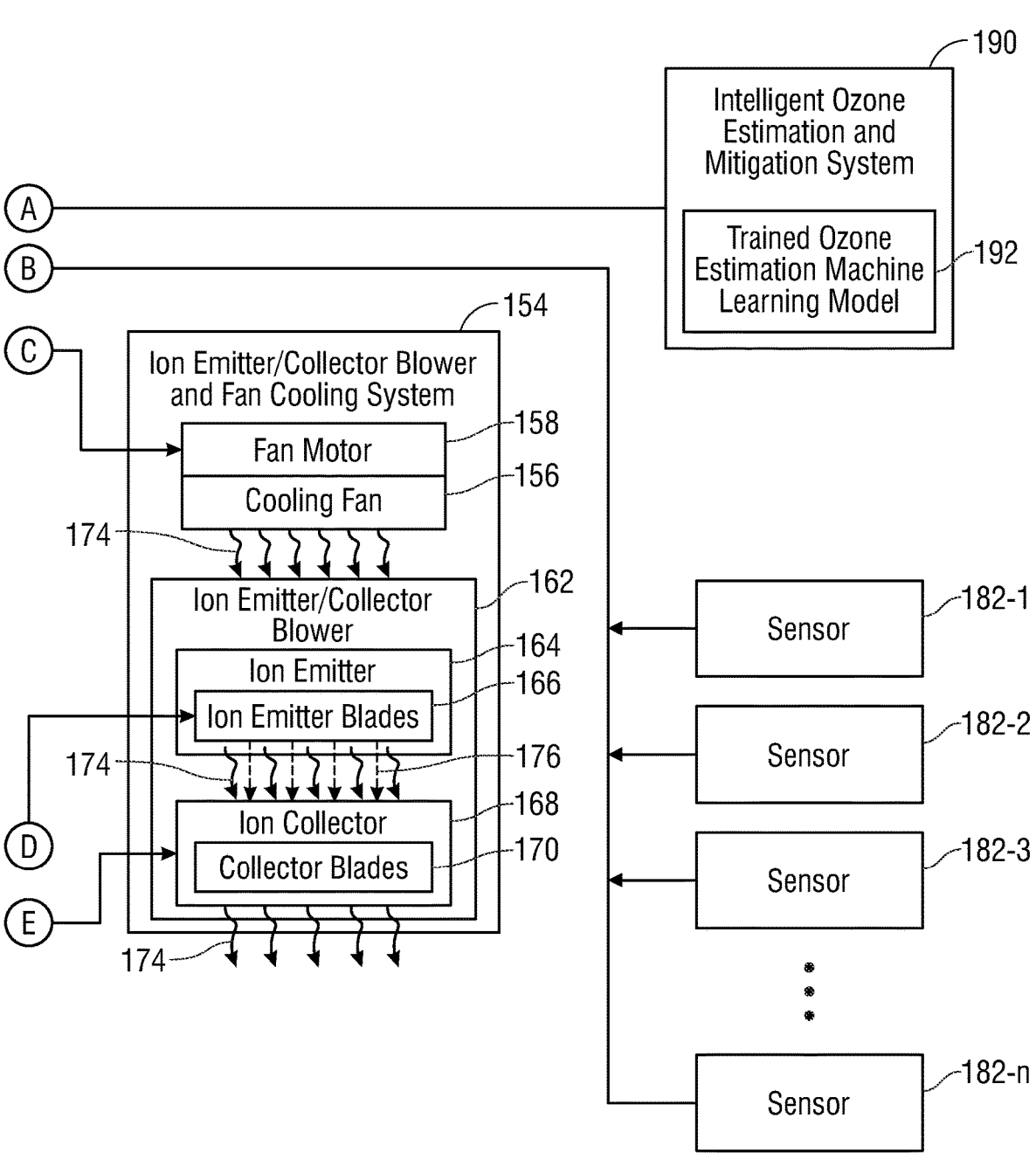

FIGS. 1A and 1B illustrates an information handling system 100 similar to information handling systems according to several aspects of the present disclosure that is operatively coupled to an ion emitter/collector blower cooling system 154 formed within a housing of the information handling system. The information handling system 100 executes, with a hardware processor, embedded controller 103 or other hardware processing resources, a contextual cooling device switching system 178 with a supervised binary or multi-level classification algorithm 180. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a two-in-one computer, a tablet, a smartphone, a communications device, an access point (AP), a base station transceiver, a wireless telephone, a control system, a camera, a scanner, a printer, a personal trusted device, a web appliance, or any other suitable machine capable of executing a set of machine-readable code instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed)

network environment. In a particular embodiment, the computer system 100 can be implemented using electronic devices that provide voice, video, or data communication. For example, an information handling system 100 may be any mobile or other computing device capable of executing, via a hardware processing resource, a set of machine-readable code instructions (sequential or otherwise) that specify actions to be taken by that machine. In an embodiment, the information handling system 100 may be operatively coupled to a server or other network device as well as with any wireless peripheral devices. Further, while a single information handling system 100 is illustrated, the term "system" shall also be taken to include any collection of systems or sub-systems that individually or jointly utilized one or more hardware processing resources to execute a set, or multiple sets, of machine-readable code instructions to perform one or more computer functions.

The information handling system 100 may include memory (volatile (e.g., random-access memory, etc.), non-volatile (read-only memory, flash memory etc.) or any combination thereof), one or more hardware processing resources, such as a central processing unit (CPU) 102, a graphics processing unit (GPU) 152, an embedded controller (EC) 103, other hardware processing device, hardware controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the hardware devices or hardware processing resources to execute machine-readable code instructions for the one or more systems and modules described above and operates to perform one or more of the methods described herein. For example, machine-readable code instructions may be executed by an EC 103, a PMU controller, or other hardware processing resource for an ion emitter/collector blower cooling system 154 to control the ion emitter/collector blower 162 and cooling fan 156 based on the execution of code instructions of the contextual cooling device switching system 178 for operation of an ion emitter/collector and fan cooling system 154 described in embodiments herein. The information handling system 100 may execute machine-readable code instructions 110 via hardware processing resources that may operate on servers or systems, remote data centers, or on-box in individual client information handling systems according to various embodiments herein. In some embodiments, it is understood any or all portions of machine-readable code instructions 110 may operate on a plurality of information handling systems 100.

The information handling system 100 may include hardware processing resources such as a hardware processor 102, a central processing unit (CPU), accelerated processing unit (APU), a neural processing unit (NPU), a vision processing unit (VPU), the EC 103, a digital signal processor (DSP), a GPU 152, a microcontroller, or any other type of hardware processing device that executes machine-readable code instructions to perform the processes described herein. Any of the hardware processing resources may operate to execute code that is either firmware or software code. Moreover, the information handling system 100 can include memory such as main memory 104, static memory 106, computer readable medium 108 storing machine-readable code instructions 110 of, in an example embodiment, an ion emitter/collector blower and fan control system 178 (e.g., controlled by a power management unit (PMU) hardware controller hardware processor 102, or an EC 103), or other computer executable program code, and drive unit 118 (volatile (e.g., random-access memory, etc.), nonvolatile (read-only memory, flash memory etc.) or any combination thereof). In embodiments described herein, computer-readable program code associated with contextual cooling device switching system 178 and a supervised binary or multi-level classification algorithm 180 may be stored on non-volatile memory such as main memory 104 and may be made to be accessible by a hardware processing device such as an EC 103 for execution.

As shown, the information handling system 100 may further include a video display device 142. The video display device 142, in an embodiment, may function as a liquid crystal display (LCD), an organic light emitting diode (OLED), a flat panel display, or a solid-state display. Although FIGS. 1A and 1B shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the hardware processor 102 of the information handling system. In this example embodiment, a window may be presented to the user that provides a graphical user interface (GUI) representing the execution of that application. In an embodiment, a GUI may be presented to a user that allows a user to select from a plurality of settings including settings associated with the execution of the contextual cooling device switching system 178 by a hardware processor (e.g., an EC 103) as described herein. In an embodiment, a microphone 143 may capture audio around the information handling system 100 including, in an embodiment, the user's voices as well as any ambient sounds around the information handling system 100. Moreover, a microphone 143 may also capture noise generated via operation of the cooling systems such as the cooling fan 156. In an embodiment, the level of captured audio is used as input to the binary or multi-level classification algorithm for control of fan versus emitter/collector blower to cool the information handling system 100 as described herein.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station

138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIGS. 1A and 1B shows a single antenna 132, the present specification contemplates that the number of antennas 132 may include more or less of the number of individual antennas shown in FIGS. 1A and 1B. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2. Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may include and be operatively coupled to an ion emitter/collector blower and fan cooling system 154. The ion emitter/collector blower and fan cooling system 154 includes a cooling fan 156 and an ion emitter/collector blower 162 coupled within a housing of the information handling system 100 in an embodiment so that heat generated by the operation of the heat generating hardware (e.g., hardware processor 102, memory devices 104, 106, PMU 120, CPU, GPU, etc.) may be directed out of the housing of the information handling system 100 via an air exhaust vent formed in the housing (e.g., at a top side surface of the housing of the information handling system 100). The ion emitter/collector blower and fan cooling system 154 may include the ion emitter/collector blower 162 that may, in an example embodiment, include a housing used to house the components of the ion emitter/collector blower 162 described herein in an embodiment. In an alternative embodiment, the ion emitter/collector blower 162 does not include a housing and instead, those components of the ion emitter/collector blower and fan cooling system 154 are operatively coupled to an interior surface of the housing of the information handling system 100. For case of discussion, the ion emitter/collector blower 162 of the ion emitter/collector blower and fan cooling system 154 will be described as including a housing which allows the ion emitter/collector blower 162 to be modular and replaced if necessary.

The ion emitter/collector blower 162 of the ion emitter/collector blower and fan cooling system 154 includes an ion emitter 164. In an embodiment, the ion emitter 164 includes a plurality of ion emitter blades 166 through which air may pass and which are used to create an airflow into, through, and out of the ion emitter/collector blower 162. The number of ion emitter blades 166 may vary depending on an anticipated level of heat generation by the hardware components within the information handling system 100, and the shape and design of the housing of the ion emitter/collector blower 162, or housing of the information handling system 100, among other factors. Each of the ion emitter blades 166 are coupled to an electrode of a high voltage source of an ionic driving circuit 172. In an embodiment, each of the ion emitter blades 166 includes a blade edge. In one embodiment, the blade edges may be made to come to a sharp point in order to facilitate the creation of more ions 172 than would otherwise be created from a flat or non-sharped edge. In an embodiment, the ions created at the ion emitter may be increased via application of a higher voltage to the ion emitter blades 166. The creation of more ions also creates more airflow through the ion emitter/collector blower 162 thereby increasing the ability of the ion emitter/collector blower 162 to cool down systems or hardware better. At a point, the amount of voltage applied to the ion emitter 164 may not be increased due to the possibility of arcing between the ion emitter 164 and ion collector 168. This upper limit of voltage may define the maximum amount of airflow that can be created by the ion emitter/collector blower 162.

In an embodiment, the ion emitter/collector blower 162 and the ion emitter blades 166 may be made of a refractory metal such as niobium, chromium, molybdenum, tantalum, tungsten, and rhenium among others. In an embodiment, the portions of the ion emitter/collector blower 162 and ion emitter blades 166 may be electroplated with a refractory metal such as niobium, chromium, molybdenum, tantalum, tungsten, and rhenium among others with an interior layer of the ion emitter blades 166 being made of a conductive material such as iron. It is appreciated that the ion emitter blades 166 may be made of any alloy of metal that includes alloys of those refractory metals described herein.

The ion emitter/collector blower 162 also includes an ion collector 168. In an embodiment, the ion collector 168 includes a plurality of ion collector blades 170 through which air may pass and which are used to deionize those ions 176 created at the ion emitter 164 as described herein. The number of ion collector blades 170 may vary depending on an anticipated level of heat generation by the hardware components within the information handling system 100 and the shape and design of the housing of the ion emitter/collector blower 162, or the housing of the information handling system 100, among other factors such as the creation of ions 176 at the ion emitter 164. Each of the ion collector blades 170 are coupled to an electrode of a high voltage source of an ionic driving circuit 172 in an embodiment. In an embodiment, the ion collector blades 170 are coupled to a grounding source used to prevent arcing between the ion emitter 164 and ion collector 168. In an embodiment, each of the ion collector blades 170 includes a blade edge. It is appreciated that the ion collector blades 170 may be made of any alloy of metal that includes alloys of those refractory metals described herein.

As described herein, the ion emitter 164 and its ion emitter blades 166 as well as the ion collector 168 and its ion collector blades 170 are electrically coupled to a high voltage source (e.g., 2 kV to 10 kV voltage source difference between the ion emitter 164 and the ion collector 168). In an embodiment, the ionic driving circuit 172 may include a boost converter that provides, for the high voltage source of the ionic driving circuit 172, those voltages described herein to the ion emitter 164 and ion collector 168. Control of voltage levels from the ionic driving circuit 172 and PMU 120 power to the ion emitter/collector blower 162 may be managed by execution of code instructions of the contextual cooling device switching system 178 operating with portions of the ion emitter/collector blower and fan cooling system 154 by the EC 103, PMU controller, or some combination to select an airflow level or ramp up airflow production as well as ambient noise levels of the ion emitter/collector blower and fan cooling system 154. As described herein, the ion emitter/collector blower and fan cooling system 154 includes hardware associated with the cooling fan 156 and ion/emitter/collector blower 166 that receives instructions from a hardware processor 102, embedded controller 103, or other hardware processing resource pursuant to the execution of the contextual cooling device switching system 178 by the hardware processing resource.

As described in embodiments herein, the ion emitter 164 of the ion emitter/collector blower 162 may be operatively coupled to an ionic driving circuit 172. In an embodiment, the ionic driving circuit 172 is controlled via execution of code instructions of the contextual cooling device switching system 178 to control the ion emitter/collector blower 162 of the ion emitter/collector blower and fan cooling system 154 on the hardware processor 102, the PMU 120 with a hardware controller, an EC 103, or the like. The ionic driving circuit 172, in an embodiment, includes or is coupled to a high voltage source that is operatively coupled to the ion emitter/collector blower 162. In an embodiment, the high voltage source may include a boost converter that steps up voltage from its input (e.g., a battery 122 or AC power adapter 124) to the output at the ion emitter 164 and/or the ion collector 168 of the ion emitter/collector blower 162. The high voltage source of the ionic driving circuit 172 causes the ion emitter 164 to emit ions 176 from the edges of each ion emitter blades 166. Some variation may be allowed from a voltage minimum to the voltage maximum to adjust airflow capacity of the ion emitter/collector blower 162. In the context of the present specification, the term "emit" or "emitter" is meant to describe an action and device that, at its edges or other surfaces, creates ions 176 and, via an electromagnetic repulsion, repels those ions 176 towards an attracting, oppositely charged source such as the ion collector 168 described herein. In an embodiment, the high voltage source of the ionic driving circuit 172 causes electrons to be ripped away from certain molecules such as gas molecules in the atmosphere thereby creating ions 176 (e.g., positively-charged ions 176) at the edges or other surfaces of the ion emitter blades 166. This ionization process may include the removal of one or more electrons from the outer valence shells of the individual molecules within the gas such that they become positively charged (e.g., cations) in an embodiment. Higher voltage may generate more ions up to a limit of airflow available via the ion emitter/collector blower 162. In an example where the interior of the housing of the ion emitter/collector blower 162 includes atmospheric air, any number of types of gas molecules may be subjected to this process. For example, where the gas includes oxygen ($O_2$), the ionization of oxygen may include the removal of a single electron or two electrons from the oxygen molecule. This may lead to a $O_2^+$ or $O_2^{2+}$ ion (e.g., cation molecules or individual atoms) being created by the ion emitter/collector blower 162 and ionic driving circuit 172 in an embodiment. Other gas molecules or molecules within the atmosphere within the ion emitter/collector blower 162 may similarly be ionized such as nitrogen, carbon dioxide, argon, hydrogen, etc. to create other ions 172 such as $N^{+1}$, $N^{+2}$, $N^{+3}$, $N^{+4}$, $N^{+5}$, $O_3$ (ozone), $H^{+1}$.

This ionization of the atmospheric gases within ion emitter/collector blower 162 helps to cause an airflow 174 into, within, and out of the ion emitter/collector blower 162. In an embodiment, the movement of the ions 176 from the ion emitter 164 to the ion collector 168 creates a shearing force on the air (e.g., ionized molecules drag non-ionized molecules) within the ion emitter/collector blower 162. With higher voltage levels, a greater number of ions are generated providing more shearing force up to a limit. This shearing force pulls the other air molecules in the direction of the magnetic pull of the ions 172 created by the ion emitter 164 towards the ion collector 168 thereby creating this airflow 174. In an embodiment, the movement of the ions 176 created and emitted from the ion emitter 164 may be from the ion emitter 164 to the ion collector 168. In an example embodiment, the ion emitter 164 may each be operatively coupled to a positive electrode of the high voltage source of the ionic driving circuit 172. As a result of generating the positively charged ions 176, the charged ion emitter 164 now repels those positively charged ions 176 causing the charged ions 176 to be repelled away from the ion emitter 164, following the electric field created between the ion emitter 164 and ion collector 168, and attracted to the ion collector 168.

In an embodiment, the ion collectors 160, 166 are each operatively coupled to a negative or opposite electrode of the high voltage source of the ionic driving circuit 172. In an embodiment, the ion collector 168 are operatively coupled to a grounding source or high voltage negative source of the ionic driving circuit 172. Whether the ion collector 168 is operatively coupled to a negative electrode of the high voltage source or to ground of the high voltage source of the ionic driving circuit 172, the voltage difference between the ion emitter 164 and the ion collector 168 determines an electric field between ion emitter 164 and the ion collector 168. The ions 176 created by the ion emitter 164 follow this electric field. In an embodiment where the ion collector 168 is operatively coupled to a negative electrode of the high voltage source and not ground, the ion collector 168 may be electrically insulated from the remaining portions of the ion emitter/collector blower 162 and its housing. In an embodiment, this electrical isolation may be accomplished by making the housing of the ion emitter/collector blower 162 out of an electrically non-conductive material such as plastic. In an embodiment, the electrical isolation may be accomplished by placing an insulative gasket between the ion collector 168 and a housing of the ion emitter/collector blower 162 and the ion emitter 164. The electrical isolation of the ion collector 168 allows for the electrical field between the ion emitter 164 and ion collector 168 to be formed allowing for an electrical field path for the ions 176 to follow.

In an embodiment, the creation of the electric field between the ion emitter 164 and ion collector 168 causes the positively-charged ions 176 created by the ion emitter 164 to be attracted to the negatively charged ion collector 168 further causing movement of the ions 176 and creating the airflow 174 described herein. As the positively-charged ions 176 reach the ion collector 168, those missing valence electrons stripped away by the ion emitter 164 at the ions 172 may be added to a valence shell of the ionized molecules placing those gases at a neutral electrical charge again. Following the example of the ionization of the oxygen molecules in the atmospheric gases within the ion emitter/collector blower 162 by the ion emitter 164, as these $O_2^+$ or $O_2^{2+}$ ions 176 (e.g., cations) have their extraneous electrons returned from at their valence electron shells (e.g., a single electron or two electrons, respectively) the oxygen molecules are placed in an electrically neutral state. This airflow created by this ionization process provides for the ion emitter/collector 162 to have silent or near-silent airflow. This silent or near-silent operation of the ion emitter/collector 162 is limited, due to the limited cooling capacity in some embodiments, as to effectiveness to cool the hardware within the information handling system 100.

In an embodiment, the creation of this airflow 174, via the operation of the ion emitter/collector blower 162 and ionic movement of the ions 176 created by the ion emitter 164, has a low-pressure head of around 0.04 to 0.05 inches of $H_2O$ (water column) as compared to the rotation of a fan (e.g., fan 156) or another type of blower that may have a pressure head of around 0.5 inches of $H_2O$. However, the flow rate of air into and out of the information handling system 100 using the ion emitter/collector blower 162 via operation of the ion emitter 164 creating ions 176 is relatively higher than just the potential flow rate of air created by the rotation of a fan 156 by itself. Further, creation of airflow 174 by the ion emitter/collector blower 162 and ions 176 is virtually silent. For purposes of the present specification, the term "pressure head" is defined as the height of a fluid (e.g., air, water or other fluids) column that corresponds to a particular pressure exerted by the fluid column corresponding to pressure or psi of airflow created by the ionization of air. With the relatively substantial airflow rate with lower pressure head of the ion emitter/collector blower 162, the acoustics of the ion emitter/collector blower 162 are near silent and lower than the fan 156 in an embodiment when the fan 156 is not used. For this reason, it may serve as a first source of active airflow generation before initiation or capacity increases are instructed by the ion emitter/collector blower and fan control system 154 and directed by the contextual cooling device switching system 178 depending on settings for detected and anticipated workload characteristic values in embodiments herein.

In an embodiment described herein, the airflow 174 created by the ion emitter/collector blower 162 may be supplemented by an airflow generated by the operation of a cooling fan 156. In an embodiment, the cooling fan 156 may be placed upstream or at an air intake of the ion emitter/collector blower 162 so that air may pass through a housing of the cooling fan 156, enter the ion emitter/collector blower 162, and be accelerated through the housing of the ion emitter/collector blower 162 and out of the ion emitter/collector blower 162. This series arrangement of the fan 156 to the ion emitter/collector blower 162 allows for the selective activation of the fan 156, the ion emitter/collector blower 162, or both based on, for example, a temperature detected within the chassis of the information handling system 100, specific hardware devices within the housing, or a combination of hardware devices within the housing of the information handling system 100. It is appreciated, however, that the ion emitter/collector blower 162 and cooling fan 156 are not placed in series and that these cooling systems may work independent of each other. For simplicity in description, the present specification describes the ion emitter/collector blower 162 being placed in series with the cooling fan 156.

Selective activation of the cooling fan 156 and ion emitter/collector blower 162 may be conducted by the execution of computer readable program code of the contextual cooling device switching system 178 by a hardware processing device and further control of levels of capacity for the ion emitter/collector blower 162 and the cooling fan 156 in embodiments herein. Execution of computer readable program code of the ion emitter/collector blower and fan cooling system 154 by a hardware processing device control the motor driver hardware 160 to initiate the rotation of the cooling fan 156 via fan motor 158 and control the rotational speed of the cooling fan 156. Control of capacity of the ion emitter/collector blower 162, for example, may be linearly increased as temperature or power is increased within the information handling system until the ion emitter/collector blower 162 reaches a maximum capacity in an example embodiment. In an alternative embodiment, the power consumed by one or more hardware devices within the information handling system 100 may indicate if and when the cooling fan 156, the ion emitter/collector blower 162, or both are activated to create an airflow through the housing of the information handling system 100. In an embodiment, the contextual cooling device switching system 178 may execute a supervised binary or multi-level classification algorithm 180 to control whether to initiate the cooling fan

156 and/or ion emitter/collector blower 162 and whether to increase or decrease their respective capabilities to create an airflow as described herein.

As described herein, a contextual cooling device switching system 178 may be executed (e.g., by a hardware processor) to control the operations of both the ion emitter/collector blower 162 and the cooling fan 156. In one embodiment, the operation of the ion emitter/collector blower 162 may be prioritized over the operation of the cooling fan 156. The execution of the contextual cooling device switching system 178 causes one or more contextual inputs to be provided to a supervised binary or multi-level classification algorithm 180 used to determine if, when, and how to activate the cooling fan 156 and ion emitter/collector blower 162. These sets of contextual input data may include contexts under which the information handling system is being operated by the user and characterizing workload values of one or more processing devices to thus control when and to what degree to activate either cooling system portion of the ion emitter/collector blower and fan cooling system 154 to create an airflow in order to anticipate operation and delay or minimize more generation where appropriate.

As described herein the contextual cooling device switching system 178 implements a binary or multi-level classification algorithm to receive the contextual inputs to control when and to what degree to activate either cooling system portion to create an airflow in order to anticipate operation and delay or minimize more generation where appropriate. It is appreciated that any binary or multi-level classification algorithm may be used including, but not limited to, decision trees, random forests, Bayesian networks, support vector machines, neural networks, logistic regression, probit models, genetic programming, multi expression programming, and linear genetic programming, among others.

In an embodiment, a context under which the information handling system is being operated by the user may include data describing a location of the information handling system and, accordingly, the user. This data may describe whether the use is within a building, a specific room, a conference room, a public location, and the like. As described herein, one or more sensors 182-1, 182-2, 182-3, 182-n may be used to detect where the user and the information handling system 100 is located. One of these sensors 182-1, 182-2, 182-3, 182-n includes hardware associated with the access point 136 or base station 138 that provides GPS location data, signal triangulation data, and other location data the describes the location of the information handling system 100. In an embodiment, the microphone 143 may capture audio around the information handling system 100 including, in an embodiment, the user's voices as well as any ambient sounds around the information handling system 100. Additionally, cooling fan 156 noise is also detected by the microphone 143. In an embodiment, the level of captured audio is used as input to the binary or multi-level classification algorithm for control of fan versus emitter/collector blower to cool the information handling system 100 as described herein.

Still further, the sensors 182-1, 182-2, 182-3, 182-n may include an imaging device 188 used to detect whether the user is present in front of the information handling system 100. This data may be used, in an example embodiment, as input to a supervised binary or multi-level classification algorithm 180 of the contextual cooling device switching system 178 during execution of the contextual cooling device switching system 178. The supervised binary or multi-level classification algorithm 180 may use this data to determine, in some examples, an ozone level at or near the user and the information handling system 100. As described herein, the high voltage source of the ionic driving circuit 172 causes electrons to be ripped away from certain molecules such as gas molecules in the atmosphere thereby creating ions (e.g., positively charged ions or cations) at the edges or other surfaces of the ion emitter 164. This ionization process may include the removal of one or more electrons from the outer valence shells of the individual molecules within the gas such that they become positively charged (e.g., cation). In an example where the space between the ion emitter 164 and ion collector 168 includes atmospheric air, any number of types of gas molecules may be subjected to this process. For example, where the gas includes oxygen (O), the ionization of oxygen may include stripping an electron from molecules and forcing the removal of a single electron or a plurality of electrons from the oxygen molecule or molecule. This may lead to a $O^+$ or $O^{2+}$ ion (e.g., cation) being created by the ion emitter 164 and ionic driving circuit 172 in an embodiment. Other gas molecules/atoms within the atmosphere between the ion emitter 164 and ion collector 168 may similarly be ionized such as nitrogen, carbon dioxide, argon, hydrogen, etc. It is appreciated as well, that this ionization process may also cause ozone to be created. In this example embodiment, a single ionized oxygen molecule ($O_2$) may be attracted to and combine with an oxygen molecule ($O_2$) to form an ozone molecule ($O_3$). This ozone molecule has a slightly positive dipole moment causing the ozone molecule to be repelled from the ion emitter 164 and attracted to the ion collector 168. In an embodiment, the ozone molecules, along with the other ionized molecules and molecules, create a shearing force against the other molecules in the atmosphere between the ion emitter 164 and ion collector 168 thereby creating an airflow from the ion emitter 164 to the ion collector 168. In an embodiment, the ion collector 168 may be in the form of a thermal fin set that allows the airflow to pass through the ion collector 168 and out of the ion emitter/collector blower 162 and, further out of a housing of the information handling system 100 via, for example, and exhaust vent. In another embodiment, the airflow created by the ion emitter 164 and ion collector 168 may be passed to a cooling fan 156 or other additional active cooling systems within the housing of the information handling system 100. Additionally, other passive cooling systems may be included and associated with the ion emitter 164 and ion collector 168 such as vapor chambers, heat pipes, and heat conductors.

As a result of the ion emitter 164 creating ozone within the housing of the information handling system 100 and using that ozone as an ion that creates a shear force on the other molecules in the atmosphere to create the airflow, some of this ozone may be accidentally expelled from the housing of the information handling system 100. The amount of ozone expelled may be estimated and mitigated via execution of, for example, code instructions of an intelligent ozone estimation and mitigation system 190. The intelligent ozone estimation and mitigation system 190 may include a trained ozone estimation machine learning model executable by the hardware processor 102, such as a central processing unit (CPU), and/or other hardware processor to estimate ozone production levels from the ion emitter/collector blower 162 based on modeled dimensions and distances of the emitter 164 and collector 168, power levels supplied by the ion driving circuit 172, airflow levels, configuration within and of the information handling system housing and other inputs to determine predicted ozone levels during operation as characterized by a manufacturer during testing.

In an embodiment, the trained ozone estimation machine learning model 192 may be trained prior to the user purchasing or receiving the information handling system 100. In an embodiment, the training of the trained ozone estimation machine learning model 192 of the intelligent ozone estimation and mitigation system 190 may be completed via testing procedures conducted by the manufacturer and may be based on ozone detected by an ozone detector during these testing procedures. In an example embodiment, a plurality of static and non-static measurements are used to train an ozone estimation machine learning model remotely to get a trained ozone estimation machine learning model 192. In an example embodiment, these static variables used as input to train the trained ozone estimation machine learning model 192 include a distance measurement between the ion emitter 164 and ion collector 168, an orientation of the information handling system 100, an average distance from the user to an exhaust vent where ozone may be expelled from out of the housing of the information handling system 100, the size of the ion emitter 164 as compared to the size of the ion collector 168, among other static measurements. Additionally, non-static measurements used as input to train the trained ozone estimation machine learning model 192 includes data received from a power consumption sensor, ion emitter 164 and ion collector 168 operating voltage obtained via an ion emitter 164 and ion collector 168 operating voltage sensor, data obtained from one or more temperature sensors placed at various locations within the information handling system 100 to monitor for temperatures within the housing of the information handling system 100, and data obtained from one or more humidity sensors, among other input data. These static and non-static measurements are used as input to train the ozone estimation machine learning model 192 of the intelligent ozone estimation and mitigation system 190 so that output from the execution of the ozone estimation machine learning model 192 may be used as one of the contextual inputs into the supervised binary or multi-level classification algorithm 180 described herein.

Thus, the execution of the trained ozone estimation machine learning model 192 by the hardware processor may identify an ozone estimation value estimating the amount of ozone produced at the ion emitter/collector blower 162 while an ozone mitigation system 190 causes a mitigation process to be conducted when the ozone estimation value estimating the amount of ozone produced at the ion emitter/ collector cooling system indicates that an ozone threshold limit has been reached. In an embodiment, the ozone threshold limit may be set to an ozone level that is approved by, for example, a governmental entity such as the Occupational Safety and Health Administration (OSHA) in the United States. Other ozone threshold limits may be set such as ozone levels at or below 0.1 ppm over an eight-hour time frame or 0.2 ppm within a four-hour time frame and the like. In an embodiment, the ozone threshold limit may be set at an ozone level below those described herein in order to prevent ozone levels reaching those potentially unacceptable levels.

The execution of the supervised binary or multi-level classification algorithm 180 by the contextual cooling device switching system 178, therefore, considers the estimated ozone production at the ion emitter/collector blower 162 with the estimated ozone production as calculated by the intelligent ozone estimation and mitigation system 190 being used as input into the binary or multi-level classification algorithm described herein. Additionally, the location of the information handling system 100 (e.g., within a closed room or outside) and the presence of the user is used as contextual input into the binary or multi-level classification algorithm along with the estimated ozone production output from the intelligent ozone estimation and mitigation system 190 to determine whether and to what extent operate the ion emitter/collector blower 162 or cooling fan 156 to maintain acceptable levels of ozone in various operating circumstances or locations.

In an embodiment, a context under which the information handling system is being operated by the user may include a selection of one or more operating modes selected by a user via, for example, a GUI presented to the user on the video display device 142. In an example embodiment, operating modes may include a performance mode, a power mode, and a quiet mode. In the context of the present specification, a performance mode may be an operating mode under which the information handling system 100 prioritizes the performance of the information handling system 100 that includes prioritizing the power limits to maximize performance especially when executing program applications as the hardware processor 102 associated with content creation. In the context of the present specification, a power mode may be an operating mode under which the information handling system 100 prioritizes the power consumption by the hardware devices when, for example, the information handling system 100 is operating on power provided by the battery 122. In the context of the present specification, a quiet mode may be an operating mode that prioritizes a reduction in noise such as produced via operation of the cooling fan 156 over other operations such as processing and power resources. In an embodiment, the hardware processor 102 may be used to detect and determine which of the operating modes are selected by the user. Additionally, this data may be used as input to the supervised binary or multi-level classification algorithm 180 to determine if the cooling fan 156 and/or ion emitter/collector blower 162 should be activated and whether to increase the voltage applied to the ion emitter 164 to create more ion airflow and/or the level of the rotation speed of the cooling fan 156 for generation of cooling or venting airflow as described herein.

In an embodiment, a context under which the information handling system is being operated by the user includes an orientation of the information handling system 100. In the example embodiments where the information handling system 100 is a laptop-type information handling system, the orientation may include a closed orientation, a laptop orientation, a tablet orientation, a dual tablet configuration, and a tent orientation. The closed orientation is an orientation where the display portion of the laptop-type information handling system 100 is closed onto the base portion of the information handling system 100. The tablet configuration is an orientation where the information handling system is in a tablet form or where the base portion of the information handling system is made to flip behind the display portion. In a dual tablet configuration, the information handling system 100 may be made of a base portion that includes a separate base chassis display device along with the display device of the display portion of the information handling system or a single foldable display that may span both chassis of a dual-display information handling system 100. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent configuration, the display portion may be viewable to the user with the base portion in an orientation to prop up the display portion on a table, for example. In an embodiment, one or more of the sensors 182-1, 182-2, 182-3, 182-n used to detect the orientation of the information handling system 100 may include accelerometers, hinge sensors (e.g., detecting an open, closed, or an intermittent position of the display chassis relative to the base chassis), and other positional sensors. In an embodiment, these different orientations may affect the accumulation of ozone at or near the user and may vary from information handling system 100 to information handling system 100 based on the size and shape of the housings of the base portions and display portions of the information handling system 100. Still further, the orientation of the information handling system 100 may affect the ability of the imaging device 188 to detect the user. Still further, the orientation of the information handling system 100 may affect the heat accumulated within the housing of the information handling system 100 or affect the ability of the information handling system 100 to dissipate heat.

In an embodiment, a context under which the information handling system is being operated by the user includes the detection of ambient noise at the information handling system 100. In an embodiment, a microphone 143 or one or more microphones associated with the information handling system 100 or the imaging device 188 may be used as one of the sensors 182-1, 182-2, 182-3, 182-n to detect noises and determine whether those noises are ambient noises or, for example, the voice of the user. The noises may affect whether the supervised binary or multi-level classification algorithm 180 uses this data to determine whether to activate or deactivate the cooling fan 156 that is relatively noisier than the ion emitter/collector blower 162.

The supervised binary or multi-level classification algorithm 180 may also use, as input, data describing workloads of the hardware components of the information handling system 100. These hardware components include the hardware processor 102 or other processing devices, the battery 122, and one or more memory devices (e.g., main memory 104 and static memory 106), among other hardware devices. For example, the supervised binary or multi-level classification algorithm 180 may determine a characterizing workload value for a processing device that may be defined in part or in whole by a dynamic tuning technology (DTT) settings. The DTT settings may include, for one or more hardware processing devices, priority settings that may define which of the hardware processing devices are being prioritized in an operating mode, target power settings that may define a target power setting for the hardware processing devices, throttle temperature settings that may define a control point based on the temperature of the hardware processing devices and define a temperature at which the operation of the hardware processing devices are to be throttled, and a hardware processing device throttle temperature setting that may define a control point based on the temperature of a voltage regulator used with the hardware processing devices.

The data describing characterizing workload of the hardware components of the information handling system 100 may also include characterizing workload values in this data describing the workload intensity of the hardware processing devices, the memory devices, data storage devices, and other hardware devices such as a GPU. This workload intensity value may be defined as idle, bursty, or turbo among other values. For example, where the hardware processing devices are operating under a "bursty" workload intensity, the hardware processing devices may intermittently engage in high processing tasks and low processing tasks. In another example, where the hardware processing devices are operating under a "turbo" workload intensity, the hardware processing devices may engage in continuously high processing tasks.

The data describing characterizing workload values of the hardware components of the information handling system 100 may also include analytics of process-level activity that detects foreground processes and user activity at the information handling system 100. This data may include values descriptive of those processes associated with the execution of software applications by the processing devices. For example, a foreground process may include the execution of a videoconferencing application, a web browsing application, a software development application, a computer-aided design (CAD) application, a word processing application, a video processing application, and the like. It is appreciated that the execution of these different applications will require various levels of processing resources, data storage resources, power resources, among other types of resources to operate. Inferences may be made as well to develop an application workload persona value that describes, when certain applications are executed, the required or anticipated requirements for processing, storage, and memory resources.

The data describing characterizing workload values of the hardware components of the information handling system 100 may further include battery telemetry that describes the use of battery power. This battery telemetry may describe a battery usage persona value for a user based on if, when, and how often the user disconnects the information handling system 100 from an A/C power source and uses the battery 122 instead. This battery usage persona value may represent the user as a heavy A/C power source user (e.g., termed a "corridor warrior") who sits at a cubicle most of the time, other battery usage persona values may represent a user who discharges a significant amount of power from the battery 122 before recharging the battery 122, or whether the user uses the battery 122 power during heavy processing, as well as other battery usage persona values. Similarly, other power data may be used such as data values describing whether the information handling system 100 is operatively coupled to the A/C power adapter 124, the battery 122, a docking station that includes an A/C power source, or other configurable or reconfigurable power source (e.g., reconfigurable system-on-chip directing power consumption). This battery usage persons value data may also be used as input to the supervised binary or multi-level classification algorithm 180 of the contextual cooling device switching system 178 in order to determine the power control requirements necessary to operate the cooling fan 156 and/or ion emitter/collector blower 162 and in light of the temperatures detected within the housing of the information handling system 100.

It is appreciated that other data may also affect the operation of the information handling system 100 under a variety of use scenarios may also be used as input to the supervised binary or multi-level classification algorithm 180 of the contextual cooling device switching system 178. The present specification contemplates the use of these different types of data as input in order to determine via a trained machine learning algorithm whether to initiate the cooling fan 156 and/or the ion emitter/collector blower 162 and if and how to control the speed of the cooling fan 156 and the operation of the ion emitter/collector blower 162 as described herein.

With multiple contextual data inputs including characterizing workload values as described, the computer readable program code of the supervised binary or multi-level classification algorithm 180 of the contextual cooling device switching system 178 may be executed by a hardware processing device such as an EC 103 or the hardware processor 102. In an embodiment, an EC 103 may be used to execute the contextual cooling device switching system 178 and the supervised binary or multi-level classification algorithm 180 so that processing resources of the hardware processor 102 or GPU 152, for example, are not consumed via operation of the contextual cooling device switching system 178. This may further allow the contextual cooling device switching system 178 to operate independent of the OS 114 and be controlled by the BIOS 112 instead.

During operation, the contextual cooling device switching system 178 receives from the plurality of sensors 182-1, 182-2, 182-3, 182-n, 188, 143 as well as the CPU the data describing the context under which the information handling system is being operated by the user and the data describing the characterizing workload values described herein. As output the supervised binary or multi-level classification algorithm 180 provides output to the ion emitter/collector blower and fan cooling system 154 is to, with a hardware controller, control the operation of the cooling fan 156 and the ion emitter/collector blower 162.

Additionally, the supervised binary or multi-level classification algorithm 180 may use specific classifications for cooling system instructions to the ion emitter/collector blower and fan cooling system 154 that optimize between the cooling capabilities of the cooling fan 156 and ion emitter/collector blower 162 with the quiet operation of the information handling system 100. As described herein, the operation of the cooling fan 156 is relatively louder than the silent or near silent operation of the ion emitter/collector blower 162. With the inputs described herein (e.g., the context under which the information handling system is being operated by the user and the characterizing workload values), the supervised binary or multi-level classification algorithm 180 may determine whether or not to operate under a quiet mode or determine that a quiet mode is not necessary. For example, where a user prefers long battery runtime and is currently executing a videoconference application on the information handling system 100 while drawing power from the battery 112, the supervised binary or multi-level classification algorithm 180 may determine that operating the ion emitter/collector blower 162 without operating the cooling fan 156 or ramping the ion emitter/collector blower 162 earlier to delay or postpone cooling fan 156 activation would be the best solution. This is because the user needs a quiet environment to operate the information handling system 100 based on the execution of the videoconferencing application and, based on the type of application being executed (e.g., the videoconferencing application), temperatures are unlikely to increase too much beyond the capabilities of the ion emitter/collector blower 162 to cool the hardware within the housing of the information handling system 100 if started early enough to keep a cooler temperature. In an embodiment, a hardware embedded controller 103 may execute the code instructions of the contextual cooling device switching system to prioritize the operation of the ion emitter/collector blower 162 over initialization of the cooling fan 156 when the contextual inputs and under which the information handling system 100 is being operated by the user and characterizing workload values indicate that temperatures predicted to be stable within the housing of the information handling system 100 and the operation of the cooling fan 156 is not needed.

In another use scenario, where the information handling system 100 is operatively coupled to a docking station and the imaging device 188 does not detect the presence of the user, the execution of the supervised binary or multi-level classification algorithm 180 by the contextual cooling device switching system 178 may result in the contextual cooling device switching system 178, via a controller, to activate the ion emitter/collector blower 162 and the cooling fan 156 at a higher level to quickly cool the hardware components because the noise associated with the operation of the cooling fan 156 is no longer a factor to consider (e.g., the user is away from the information handling system 100). Further, the cooling of the system can be accomplished with no power drain on the battery 122 because the information handling system 100 is operatively coupled to an A/C power source (e.g., the A/C power adapter 124). The systems and methods described herein, therefore, may also leverage user preferences as part of the input to the supervised binary or multi-level classification algorithm 180 of the contextual cooling device switching system 178 as well as detected context sensor values and characterizing workload values that the information handling system 100 is operation under in order to cool the hardware within the housing of the information handling system 100 while maximizing relatively silent operation of the information handling system 100. This increases user satisfaction and increases the capabilities of the information handling system 100 to maintain temperatures within the information handling system 100.

The information handling system 100 can include one or more sets of machine-readable code instructions 110 that can be executed to cause the computer system to perform any one or more of the methods or computer-based functions disclosed herein. For example, machine-readable code instructions 110 may execute; via hardware processing resources, various software applications, software agents, a basic input/output system (BIOS) 112 firmware and/or software, or other aspects or components. Machine-readable code instructions 110 may execute, via an EC 103, the contextual cooling device switching system 178 which is a control system for operating an ion emitter/collector blower 162 and cooling fan 156 to control temperatures within the information handling system 100 of the embodiments herein. Again, the machine-readable code instructions 110 of the contextual cooling device switching system 178 may be stored on a non-volatile memory device and made accessible to the EC 103 for execution. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of machine-readable code instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of machine-readable code instructions, parameters, or profiles 110 described herein. The disk drive unit 118 or static memory 106 also contain space for data storage. Further, the machine-readable code instructions 110 may embody one or more of the methods as described herein. In a particular embodiment, the machine-readable code instructions, parameters, and profiles 110 may reside completely, or at least partially, within the main memory 104, the static memory 106, and/or within the disk drive 118 during execution by the hardware processor 102, EC 103, or GPU 152 of information handling system 100. The main memory 104, GPU 152, EC 103, and the hardware processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may include a hardware controller and executable machine-readable code instructions to manage the power provided to the components of the information handling system 100 such as the hardware processor 102, and manage control of the cooling fan 156, ion emitter 164, ion collector 168, ionic driving circuit 172, and other hardware components described herein. The PMU 120 may control power to one or more components including the one or more drive units 118, the hardware processor 102 (e.g., CPU), the EC 103, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels or temperature via thermistors and be electrically coupled, either wired or wirelessly, to the information handling system 100 to provide this power and coupled to bus 116 to provide or receive data or machine-readable code instructions. The PMU 120 may regulate power from a power source such as a battery 122 or AC power adapter 124. In an embodiment, the battery 122 may be charged via the AC power adapter 124 and provide power to the components of the information handling system 100 via a wired connections as applicable, or when AC power from the AC power adapter 124 is removed. PMU 120 may include a hardware controller to operate with the EC 103 separately or together to execute machine-readable code instructions 110 of an ion emitter/collector blower and fan control system 178 to control the ion emitter/collector blower and fan cooling system 154 with the cooling fan 156 and ion emitter/collector blower 162 based on data input values to the supervised binary or multi-level classification algorithm 180 of the contextual cooling device switching system 178 as described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® Core class processor, ARM® brand processors, Qualcomm® Snapdragon processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
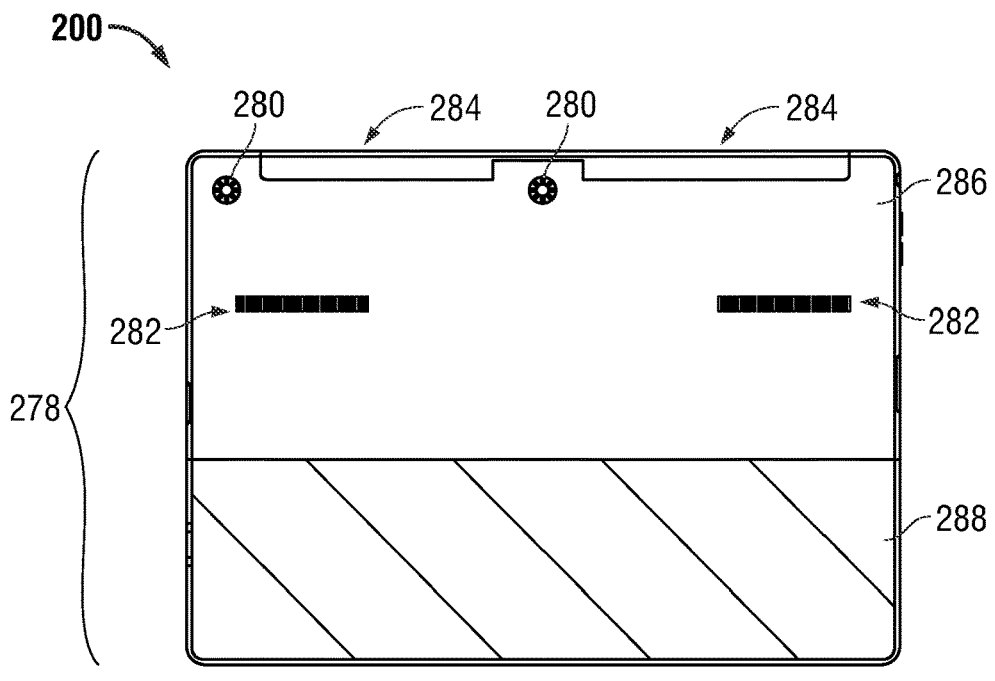
FIG. 2A is a graphic diagram bottom view of an information handling system housing a cooling fan and an ion emitter/collector blower in series according to an embodiment of the present disclosure.
Figure 2B:
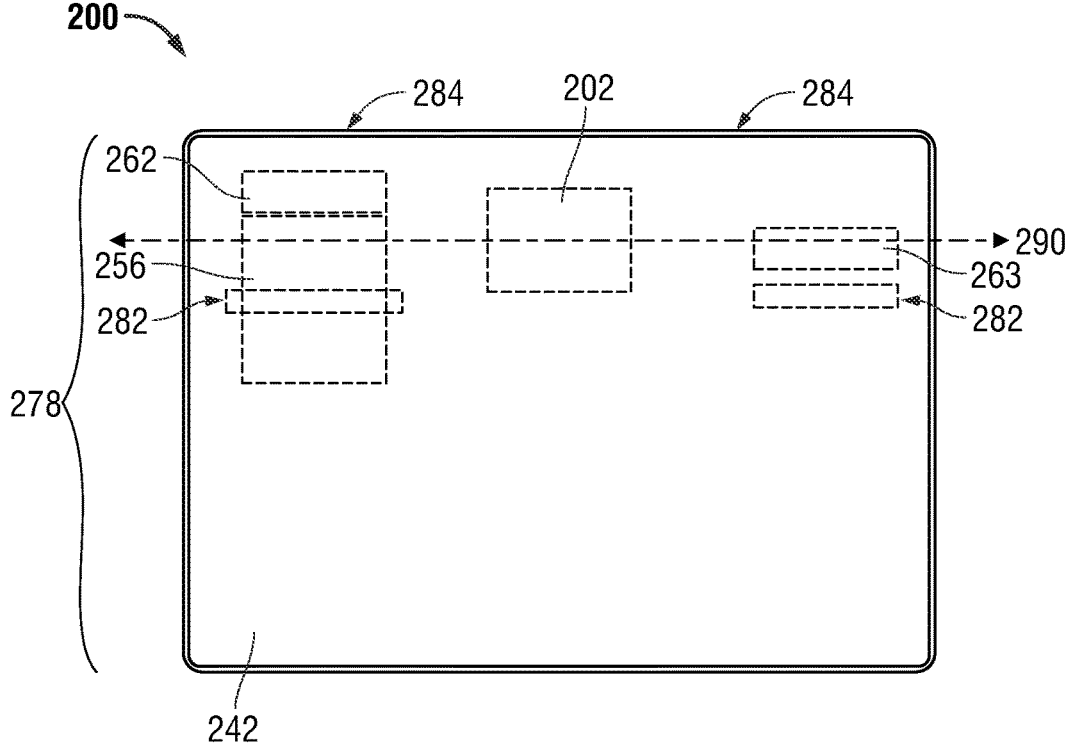
FIG. 2B is a graphic diagram top view of an information handling system housing a cooling fan and an ion emitter/collector blower in series according to another embodiment of the present disclosure.

FIG. 2A is a graphic diagram bottom view of an information handling system 200 housing a fan at a fan location 256 and an ion emitter/collector blower at an ion emitter/collector blower location 262 in series according to an embodiment of the present disclosure. Additionally, FIG. 2B is a graphic diagram top view of an information handling system 200 housing a cooling fan at a fan location 256 and an ion emitter/collector blower at an ion emitter/collector blower location 262 in series according to another embodiment of the present disclosure. The information handling system 200, as shown in FIGS. 2A and 2B, may be one of a tablet information handling system or a two-in-one information handling system or other type of mobile information handling system that may operate in a vertical, near-vertical, or otherwise upright orientation in some embodiments. Although the present specification describes the information handling system 200 as being a tablet-type information handling system, the present specification contemplates that the ion emitter/collector blower and fan cooling system described herein can be housed within any type of information handling system. Additionally, the information handling system 200 described herein includes a contextual cooling device switching system executed by a processing device (e.g., EC, hardware processor, GPU, and the like) as described herein. The execution of the contextual cooling device switching system allows for the seamless switching between operation of the ion emitter/collector blower, the cooling fan, and a combination of both so that heat may be removed from within the housing of the information handling system 200 while maximizing quiet operation of the information handling system 200.

Although FIGS. 2A and 2B show a cooling fan in a series configuration with an ion emitter/collector blower, the present specification contemplates other physical arrangements of the cooling fan and the ion emitter/collector blower within the housing of the information handling system 200. For example, in an embodiment, the cooling fan at a cooling fan location 256 may be placed separate from the ion emitter/collector at the ion emitter/collector location 262 such that the airflow produced by the cooling fan and ion emitter/collector are independent airflows of one another. In yet another example embodiment as shown in FIG. 2B, a cooling fan may be placed in series configuration with an ion emitter/collector blower with another cooling fan (or another ion emitter/collector blower) being placed elsewhere within the housing of the information handling system 200.

In an embodiment shown in FIGS. 2A and 2B, the information handling system 200 may include a wireless or detachable keyboard (not shown) used by the user to provide input to the information handling system 200. In an embodiment, the video display device 242 of the information handling system 200 may be a touch display device that also or alternatively allows the user to provide input to and receive output from the information handling system 200. As described herein, the video display device 242 may serve as a cover or chassis used as a cover for the hardware devices within the display chassis 278.

In an embodiment, the information handling system 200 may include a display chassis 278 that includes the back cover 286 and the video display device 242 acting as a front cover. The back cover 286 and video display device 242 may be used to house a processor at the processor location 202 as well as ion emitter/collector blowers at ion emitter/collector blower locations 282 and one or more fans at a fan location 256. Other hardware components such as a battery (not shown), a memory device (not shown), a PMU (not shown) are also housed within the display chassis 278. The front cover/video display device 242, as described herein, includes a front cover/video display device 242 that serves both to cover this hardware as well as an input and output device via the touch screen video display device as described herein. The back cover 286 may also house one or more cameras 280 or other imaging device used by a user to capture still images or videos.

In an embodiment, the ion emitter/collector blower and fan cooling system may include one or more air intake vents 282 formed vertically at or below the fan at the fan location 256. These air intake vent 282 may allow air to be drawn into the display chassis 278 via controlled activation of the ion emitter/collector blower as well as a cooling fan that may generate a cooling airflow within the information handling system. Air may be blown out of the display chassis 278 at one or more air exhaust vents 284 having an upper exhaust vent location in the vertically oriented information handling system 200 thereby cooling the air and heat-generating components (e.g., the hardware processor) within the display chassis 278.

As shown in FIGS. 2A and 2B, the ion emitter/collector blower and fan cooling system has an ion emitter/collector blower location 262 that is above the air intake vents 282 when information handling system 200 is in an upright orientation. In an embodiment, the fan location 256 and ion emitter/collector blower location 262 may straddle a hardware processor centerline 290 of the hardware processor at the hardware processor location 202 placing the ion emitter/collector blower location 262 vertically higher than the hardware processor centerline 290 and a majority of the fan location 256 below the hardware processor centerline 290.

In the present specification, the term "vertical" is meant as an upward location where the top of the information handling system 200 is where the air exhaust vents 284 are formed into the housing when the information handling system 200 is in a vertical, near-vertical, or otherwise upright orientation for discussion purposes. Therefore, in FIGS. 2A and 2B, the hardware processor centerline 290 is closer, vertically, to the air exhaust vents 284 while the fan is located at or below the hardware processor centerline 290. In the embodiment shown in FIGS. 2A and 2B, the ion emitter/collector blower and fan cooling system includes a fan at a fan location 256 in series with an ion emitter/collector blower at an ion emitter/collector blower location 262 on a left side of the information handling system 200. At the right side of the information handling system 200, the example information handling system 200 includes a single ion emitter/collector blower at an ion emitter/collector blower location 263. In an example embodiment, the information handling system 200 may include any number of ion emitter/collector blowers or fans. It is appreciated that, although the present specification describes a certain number of fans at a fan location 256 in series with a certain number of ion emitter/collector blowers at ion emitter/collector blower locations 262 or 263, more or fewer fans and ion emitter/collector blowers may be used to exhaust heated air from within the housing of the information handling system 200. Further, it is contemplated that "vertical" and the top of the information handling system 200 and location of vents 282 and 284 may be on any side of chassis 278 in various embodiments.

The air intake vents 282, in an embodiment, are placed, vertically, lower than the ion emitter/collector blower locations 262 and placed at or behind the fan location 256. The placement of the hardware processor at the fan location 256 and ion emitter/collector blower location 262 allows for the operation of the fan and ion emitter/collector blower to take advantage of a chimney effect and remove air heated around the hardware processor in some embodiments. The chimney effect, in one embodiment of the present specification, pulls air into the housing of the information handling system via the air intake vent 282, through both the fan and ion emitter/collector blower, and out of the housing via the air exhaust vents 284 due to the differences in air buoyancy between the air inside the housing of the information handling system 200 and the air outside of the information handling system 200. This may occur without the activation of the ion emitter/collector blower or the fan. When the air within the housing of the information handling system 200 is heated due to the operation of the heat-generating hardware components, cool air is pulled into the housing and accelerated through the housing via operation of the ion emitter/collector blower and fan cooling system generating the airflow which may be further enhanced based on the chimney effect. This increases the amount of cold air drawn into and heated air passed out of the housing of the information handling system 200.

As shown in FIG. 2A, the bottom or back cover 286 may include a kickstand 288 formed thereon. This kickstand 288 may allow the user to prop up the information handling system 200 on a flat surface or a lap in order to interact with the information handling system 200. The kickstand 288 can be moved to a closed orientation for the user to interact with the information handling system 200 as a tablet configuration, for example a hand-held tablet. Still further, in an embodiment where the kickstand 288 has been deployed, the user may operatively couple a detachable keyboard to the bottom edge of the information handling system 200 allowing the user to provide input to the information handling system 200.

During operation, in an example embodiment herein, the airflow created by the ion emitter/collector blower may be supplemented by an airflow generated by the operation of a fan. In an embodiment, the fan is placed upstream or at an air intake location 282 of the ion emitter/collector blower so that air may pass through a housing of the fan, enter the ion emitter/collector blower, and be accelerated through the housing of the ion emitter/collector blower and out of the ion emitter/collector blower at exhaust vent location 284. This series arrangement of the fan to the ion emitter/collector blower allows for the selective activation of the fan, the ion emitter/collector blower, or both based on, for example, a temperature detected within the chassis of the information handling system 200, specific hardware devices within the housing, or a combination of hardware devices within the housing of the information handling system 200. Additionally, or alternatively, the power consumed by one or more hardware devices within the information handling system 200 may indicate if and when the fan, the ion emitter/collector blower, or both are activated to create an airflow through the housing of the information handling system 200.

As described herein, the contextual cooling device switching system may execute, with by a hardware processing device, computer-readable program code of the supervised binary or multi-level classification algorithm and maintained on non-volatile memory on the information handling system 200. In an embodiment, a plurality of sensors as described herein provide the contextual inputs such as characterizing workload values under which the information handling system is being operated by the user. These characterizing workload values are used as input to the supervised binary or multi-level classification algorithm. The supervised binary or multi-level classification algorithm provides, as output, a decision that describes to or instructs the ion emitter/collector blower and fan cooling system when to initiate the cooling fan and/or the ion emitter/collector blower and how to operate those cooling devices.

For example, where a user prefers long battery runtime and is currently executing a videoconference application on the information handling system 200 while drawing power from the battery, the supervised binary or multi-level classification algorithm may determine from input values reflecting this scenario that operating the ion emitter/collector blower without operating the cooling fan would be the best solution. This is because the user needs a quiet environment to operate the information handling system 200 based on the execution of the videoconferencing application (e.g., an input value indicating type of application executing) and, based on the type of application being executed (e.g., the videoconferencing application), temperatures are unlikely to increase for beyond the capabilities of the ion emitter/collector blower to cool the hardware within the housing of the information handling system 200. Again, the user may also provide operation preferences inputs, in an example embodiment, via a GUI presented to the user. For example, a GUI may be presented to a user that allows a user to select from a plurality of settings including settings associated with the execution of the contextual cooling device switching system by a hardware processor (e.g., an EC) as described herein. This GUI may allow a user to select from one of a plurality of operating modes in an embodiment.

In an example embodiment, operating modes may include a performance mode, a power mode, and a quiet mode. In the context of the present specification, a performance mode may be an operating mode under which the information handling system 200 prioritizes the performance of the information handling system 200 that includes prioritizing providing high power limit levels to maximize performance especially when executing program applications as the hardware processor associated with content creation versus noise generation, power levels, power consumption, and other input factors. In another example context of the present specification, a power mode may be selected as an operating mode under which the information handling system 200 prioritizes limits on the power consumption by the hardware devices when, for example, the information handling system 200 is operating on power provided by the battery. In yet another example context of the present specification, a quiet mode may be an operating mode that prioritizes a reduction in noise such as produced via operation of the cooling fan over other operations such as processing and power resources. In an embodiment, the hardware processor may be used to detect and determine which of the operating modes are selected by the user. This data may be used as input to the supervised binary or multi-level classification algorithm to determine if the cooling fan and/or ion emitter/collector blower should be activated, whether to increase the voltage applied to the ion emitter to create more ions and/or increase the rotation speed of the cooling fan 156 as described herein.

In another use scenario of the information handling system 200 by the user, where the information handling system 200 is operatively coupled to a docking station and the imaging device does not detect the presence of the user, the execution of the supervised binary or multi-level classification algorithm by the contextual cooling device switching system may result in the contextual cooling device switching system, via a controller, to activate the ion emitter/collector blower and the cooling fan to maximize immediate cooling effect. This is because the noise associated with the operation of the cooling fan is no longer a factor to consider (e.g., the user is away from the information handling system 200) and cooling of the system can be accomplished with no power drain on the battery because the information handling system 200 is operatively coupled to an A/C power source (e.g., the A/C power adapter). The systems and methods described herein, therefore, may leverage user preference inputs as part of the input to the supervised binary or multi-level classification algorithm of the contextual cooling device switching system as well as detected context inputs and characterizing workload values that the information handling system 200 is operating under in order to cool the hardware within the housing of the information handling system 200. For example, the contextual cooling device switching system may delay or accelerate timing of when or how to activate the cooling fan (e.g., speed of cooling fan) to maximize silent cooling time of the ion emitter/collector blower or adjust for user presence. This is done while maintaining relatively silent operation of the information handling system 200. This increases user satisfaction and increases the capabilities of the information handling system 200 to maintain temperatures within the information handling system 200.

Figure 3:
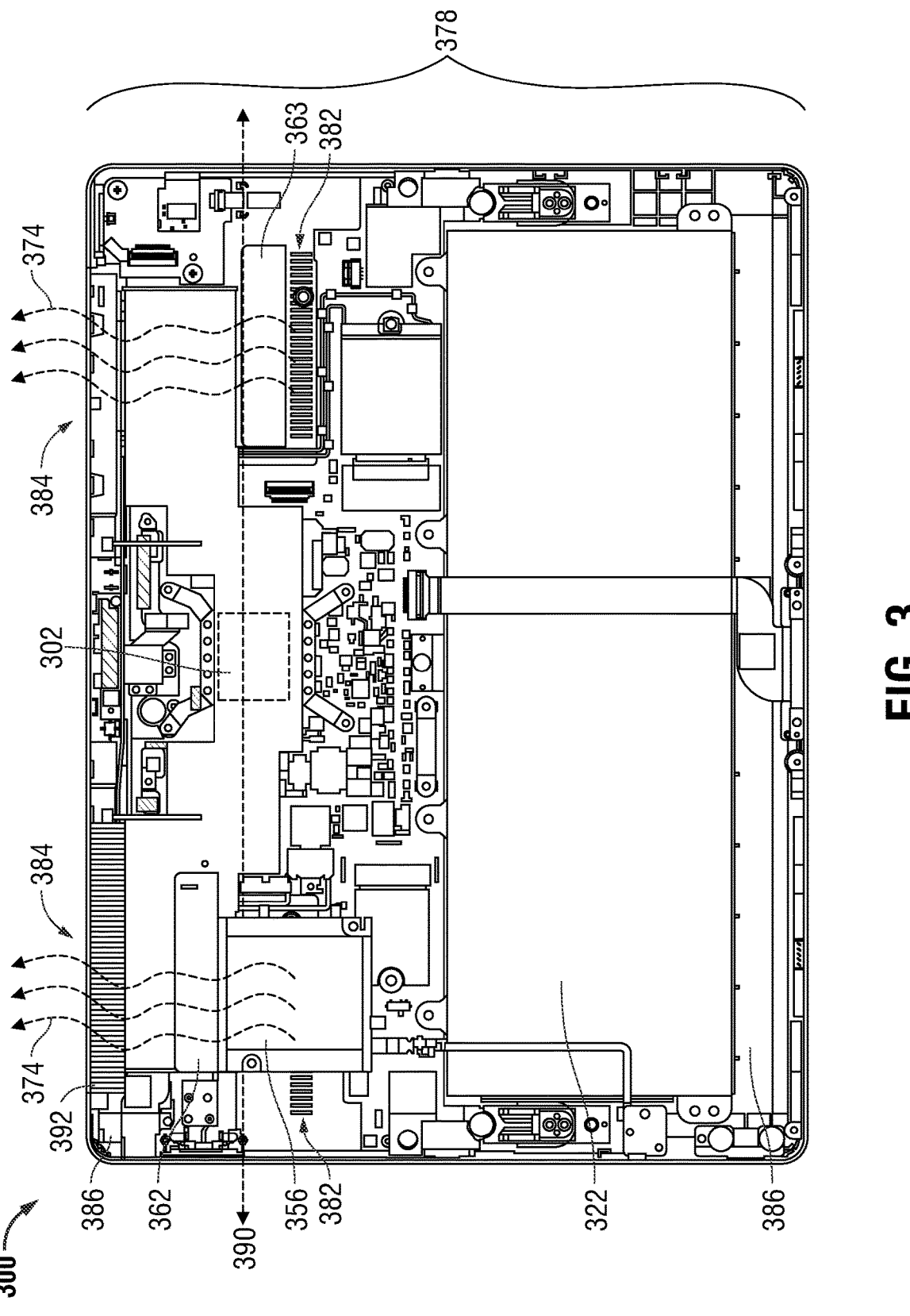
FIG. 3 is a graphic diagram top view of an interior of an information handling system including the ion emitter/collector blower and a cooling fan in series according to another embodiment of the present disclosure.

FIG. 3 is a graphic diagram top or front view of an interior of an information handling system 300 including the ion emitter/collector blower 362 and a cooling fan 356 in series according to another embodiment of the present disclosure. The information handling system 300 shown in FIG. 3 may be similar to the information handling system shown in FIG. 2B with the front cover or display (e.g., FIG. 2B, 242) removed allowing for the hardware components therein to be shown. Again, the orientation of the information handling system chassis 300 shows a tablet-type or two-in-one information handling system 300 in a vertical or upright orientation with a top of the information handling system 300 being closest to the top of the image and the bottom of the information handling system 300 being closest to the bottom of the image of FIG. 3. Again, the information handling system 300 described herein includes a contextual cooling device switching system executed by a processing device (e.g., EC, hardware processor, GPU, and the like) as described herein.

Additionally, the contextual cooling device switching system executed by a processing device (e.g., EC, hardware processor, GPU, and the like) as described herein allows for the seamless switching between operation of the ion emitter/collector blower, the cooling fan, and a combination of both so that heat may be removed from within the housing of the information handling system 300 most effectively or with the most quiet operation of the information handling system 300 depending on contextual inputs.

As described in an embodiment herein, the information handling system 300 may include a wireless or detachable keyboard (not shown) used by the user to provide input to the information handling system 300. In an embodiment, this keyboard may be operatively and mechanically couplable to a side wall (e.g., bottom wall) of the tablet-type information handling system 300.

In embodiments herein, the tablet-type or two-in-one information handling system 300 may include a display chassis 378 that includes the back cover 386 and front cover/display (not shown). The back cover 386 and front cover/display may be used to house a hardware processor at the hardware processor location 302 as well as one or more ion emitter/collector blower cooling systems that are placed to straddle a hardware processor centerline 390 or may be placed elsewhere in the tablet-type information handling system 300 when in a vertical, near-vertical, or otherwise upright orientation. Other hardware components such as a battery 322, a memory device (not shown), a PMU (not shown) are also housed within the display chassis 378 of the tablet-type or two-in-one information handling system 300 in a vertical orientation. The front cover/display (not shown), as described herein, includes a front cover/display that serves both to cover this hardware as well as an input device such as the touch screen video display device as described herein. The back cover 386 may also house a camera (not shown) or other imaging device used by a user to capture still images or videos.

As described herein, the ion emitter/collector blower cooling system may include one or more air intake vents 382 formed at or behind the cooling fan 356 or at an ion emitter/collector blower 363. FIG. 3 shows a single cooling fan 356 placed in series with a single ion emitter/collector blower 362 on the left as well as a single ion emitter/collector blower 363 on the right in an embodiment. However, it is appreciated that any number of fans 356 may be placed, in series, with any number of ion emitter/collector blowers 362 in other embodiments. The air intake vents 382 may allow air to be drawn into the display chassis 378 via the cooling fan 356, passed through the cooling fan 356 (e.g., when fan is either activated or not) and into the ion emitter/collector blower 362 in series with the cooling fan 356 or into the chassis 378 at the ion emitter/collector blower 363, and out of the air exhaust vents 384 formed at the top side wall of the back cover 386 of the display chassis 378. In one embodiment, the output vent of the cooling fan 356 may be sealed against the input vent of the ion emitter/collector blower 362 so that air passing from the housing of the cooling fan 356 may pass directly into the air intake of the ion emitter/collector blower 362. In an embodiment, the housing at the air output of the cooling fan 356 may be similarly sized to the air intake of the ion emitter/collector blower 362.

As shown in FIG. 3, the cooling fan 356 and ion emitter/collector blower 362 straddle a hardware processor centerline 390 or a centerline of another heat generating hardware component or passive cooling device. The hardware processor centerline 390 is closer, vertically, to the air exhaust vents 384 while the cooling fan 356 is located generally below the hardware processor centerline 390 since the hardware processor is typically a substantial heat producing hardware component. Still further, the air intake vent 382 is behind (e.g., in a z-direction or into the page) the cooling fan 356. The placement of the hardware processor at the hardware processor location 302 generally above cooling fan 356 allows for the operation of the cooling fan 356 and ion emitter/collector blower 362 to take advantage of a chimney effect in some embodiments to clear air heated around the location or area of the hardware processor and other heat-generating devices within the display chassis 378. The chimney effect, in the present specification, pulls air into the housing of the information handling system via the air intake vents 382 and out of the housing via the air exhaust vents 384 due to the differences in air buoyancy between the air inside the housing of the information handling system 300 and the air outside of the information handling system 300. This chimney effect may even generate some airflow even with the ion emitter/collector blowers 362, 363 or cooling fan 356 idle. With the movement of air by the cooling fan 356 and/or the ion emitter/collector blower 362 or 363, this increases the amount of cold air drawn into and heated air passed out of the housing of the information handling system 300.

As described herein, each of the ion emitter/collector blowers 362 or 363 include an ion emitter and ion collector. In an embodiment, the ion emitters include a plurality of emitter blades through which air may pass (e.g., from a fan or in from an inlet vent 382) and which are used to create an airflow 374 into, through, and out of the ion emitter/collector blower 362 or 363. The number of blades may vary depending on an anticipated level of heat generation by the hardware components within the information handling system 300, and the shape and design of the housing of the ion emitter/collector blower 362 or 363, the shape and design of the housing chassis 378 of the cooling fan 356, or housing of the information handling system 300, among other factors. Each of the emitter blades are coupled to an electrode of a high voltage source of an ionic driving circuit (not shown). In an embodiment, each of the emitter blades includes a blade edge. In one embodiment, the blade edges may be made to come to a sharp point in order to facilitate the creation of more ions. In an embodiment, the ion emitters and the emitter blades may be made of a refractory metal such as niobium, chromium, molybdenum, tantalum, tungsten, and rhenium among others. In an embodiment, the portions of the ion emitter/collector blower 362 or 363 and emitter blades may be electroplated with a refractory metal such as niobium, chromium, molybdenum, tantalum, tungsten, and rhenium among others with an interior layer of the first ion emitter and emitter blades being made of a conductive material such as iron. It is appreciated that the emitter blades may be made of any alloy of metal that includes alloys of those refractory metals described herein.

The ion emitter/collector blowers 362 or 363 also include an ion collector. In an embodiment, the ion collector includes a plurality of collector blades through which air may pass and which are used to deionize those ions created at the ion emitters as described herein. The number of collector blades may vary depending on an anticipated level of heat generation by the hardware components within the information handling system 300, the shape and design of the housing chassis 378 of the information handling system 300, the shape and design of the housing of the ion emitter/collector blower 362 or 363, among other factors such as the creation of ions at the first ion emitters. Each of the collector blades are coupled to an electrode of a high voltage source of an ionic driving circuit in an embodiment. In an embodiment, the collector blades are coupled to a grounding source used to prevent arcing between the ion emitter/collector blower 362 or 363. In an embodiment, each of the collector blades includes a blade edge. It is appreciated that the ion collector blades may be made of any alloy of metal that includes alloys of those refractory metals described herein.

The back cover 386 may include a kickstand (not shown) formed thereon. This kickstand may allow the user to prop up the tablet-type information handling system 300 in a vertical or near-vertical orientation on a flat surface or a lap in order to interact with the information handling system 300. The kickstand can be moved to a closed orientation for the user to interact with the information handling system 300 as a hand-held tablet configuration. Still further, in an embodiment where the kickstand has been deployed, the user may operatively couple a detachable keyboard to the bottom edge or sidewall of the information handling system 300 allowing the user to provide input to the information handling system 300. In such a laptop configuration, the air behind the information handling system 300 may be drawn into the display chassis 378, pass through the cooling fan 356 and ion emitter/collector blower 362 placed in series or a single ion emitter/collector blower 363, and out of the air exhaust vent 380 with convection-enhanced airflow 374. It is appreciated that the space or distance between the ion emitter/collector blower 362 or 363 and the air exhaust vents 384 may include any type of passive heat conducting device such as a fin-stack 392. In an embodiment, the fin-stack 392 may be operatively coupled to other heat conducting devices such as heat pipes or vapor chambers used to conduct heat from the hardware processor or other heat-generating devices to the fin-stack 392. Because the fin-stack 392 is in the path of the airflow 374, heat conducted into the fin-stack 392 may be dissipated into the airflow 374 via convection and passed out of the display chassis 378.

In one embodiment, a sealed channel may be formed between the ion emitter/collector blower 362 or 363 and the air exhaust vents 384 that seal the hardware processor at the hardware processor location 302 or passive heat conducting devices thermally coupled thereto into the airflow 374 path. In an embodiment, the sealed channel area may be fluidically sealed portion of the display chassis 378 or may be an additional sealing channel structure around the hardware processor, other heat-generating hardware devices, or passive cooling structures within the housing of the information handling system 300. This may focus air from the cooling fan 356 and the ion emitter/collector blower 362 to the heat generating hardware devices or passive cooling structures. For example, this sealed channel area allows heated air to be placed into the airflow between the ion emitter/collector blower 362 and fin-stack 392 and pushed out of the housing of the information handling system 300. In an embodiment, the sealed channel location may house any number of passive heat conducting devices that draw heat away from the heat-generating devices and into an airflow 374 between the ion emitter/collector blower 362 and air exhaust vent 384 acting as a fluid-to-fluid heat exchanger transferring thermal energy from the passive heat conducting devices (e.g., heat pipe, vapor chamber, fin-stack, etc.) to the air within the airflow 374.

As described herein, the contextual cooling device switching system may execute, with a hardware processing device, computer-readable program code of the supervised binary or multi-level classification algorithm that is maintained on non-volatile memory on the information handling system 300. In an embodiment, a plurality of sensors as described herein provide some of the context inputs under which the information handling system is being operated by the user. The characterizing workload values of hardware component operation levels, executing software application types, power, connectivity, selected modes, and other data input values are used as input to the supervised binary or multi-level classification algorithm. The supervised binary or multi-level classification algorithm provides, as output, a decision that describes to or instructs the ion emitter/collector blower and fan cooling system when to initiate the cooling fan and/or the ion emitter/collector blower and how to operate those cooling devices.

For example, where a user prefers long battery runtime and is currently executing a videoconference application on the information handling system 300 while drawing power from the battery, the supervised binary or multi-level classification algorithm may determine that operating the ion emitter/collector blower without operating the cooling fan would be the best solution. This is because the user needs a quiet environment to operate the information handling system 300 based on the execution of the videoconferencing application and, based on the type of application being executed (e.g., the videoconferencing application), temperatures are unlikely to increase far beyond the capabilities of the ion emitter/collector blower to cool the hardware within the housing of the information handling system 300. Again, the user may provide operation preferences, in an example embodiment, via a GUI presented to the user. For example, a GUI may be presented to a user that allows a user to select from a plurality of mode settings including mode settings associated with contextual inputs into the execution of the contextual cooling device switching system by a hardware processor (e.g., an EC) as described herein. This GUI may allow a user to select from one of a plurality of operating modes in an embodiment. In an example embodiment, operating modes may include a performance mode, a power mode, and a quiet mode.

In the context of the present specification, a performance mode may be an operating mode under which the information handling system 300 prioritizes the performance of the information handling system 300 that includes prioritizing increasing the power limits to maximize performance with higher power usage especially when executing program applications as the hardware processor associated with content creation. In the context of the present specification, a power mode may be an operating mode under which the information handling system 300 prioritizes the conservation of power consumption by the hardware devices when, for example, the information handling system 300 is operating on power provided by the battery. In the context of the present specification, a quiet mode may be an operating mode that prioritizes a reduction in noise such as produced via operation of the cooling fan over other operations such as processing and power resources. In an embodiment, the hardware processor may be used to detect and determine which of the operating modes are selected by the user. Additionally, this data may be used as contextual input to the supervised binary or multi-level classification algorithm to determine if and when the cooling fan and/or ion emitter/collector blower should be activated and whether to increase the rotation speed of the cooling fan and/or the voltage applied to the ion emitter to create more ions as described herein.

In another use scenario of the information handling system 300 by the user, where the information handling system 300 is operatively coupled to a docking station and the imaging device does not detect the presence of the user, the execution of the supervised binary or multi-level classification algorithm by the contextual cooling device switching system may result in the contextual cooling device switching system, via a controller, to activate the ion emitter/collector blower and the cooling fan at high speed. This is because the noise associated with the operation of the cooling fan is no longer a factor to consider (e.g., the user is away from the information handling system 300) and cooling of the system can be accomplished with no power drain on the battery because the information handling system 300 is operatively coupled to an A/C power source (e.g., the A/C power adapter). Such operation may allow only use of the ion emitter/collector blower later to silently maintain a cool internal temperature later when the user returns. The systems and methods described herein, therefore, may leverage user preferences as part of the contextual input to the supervised binary or multi-level classification algorithm of the contextual cooling device switching system as well as other detected context inputs and characterizing workload values that the information handling system 300 is operating under or will predictively operate under in order to cool the hardware within the housing of the information handling system 300. This is done while managing relatively silent operation of the information handling system 300 where relevant from contextual inputs. This increases user satisfaction and increases the capabilities of the information handling system 300 to maintain temperatures within the information handling system 300.

Figure 4:
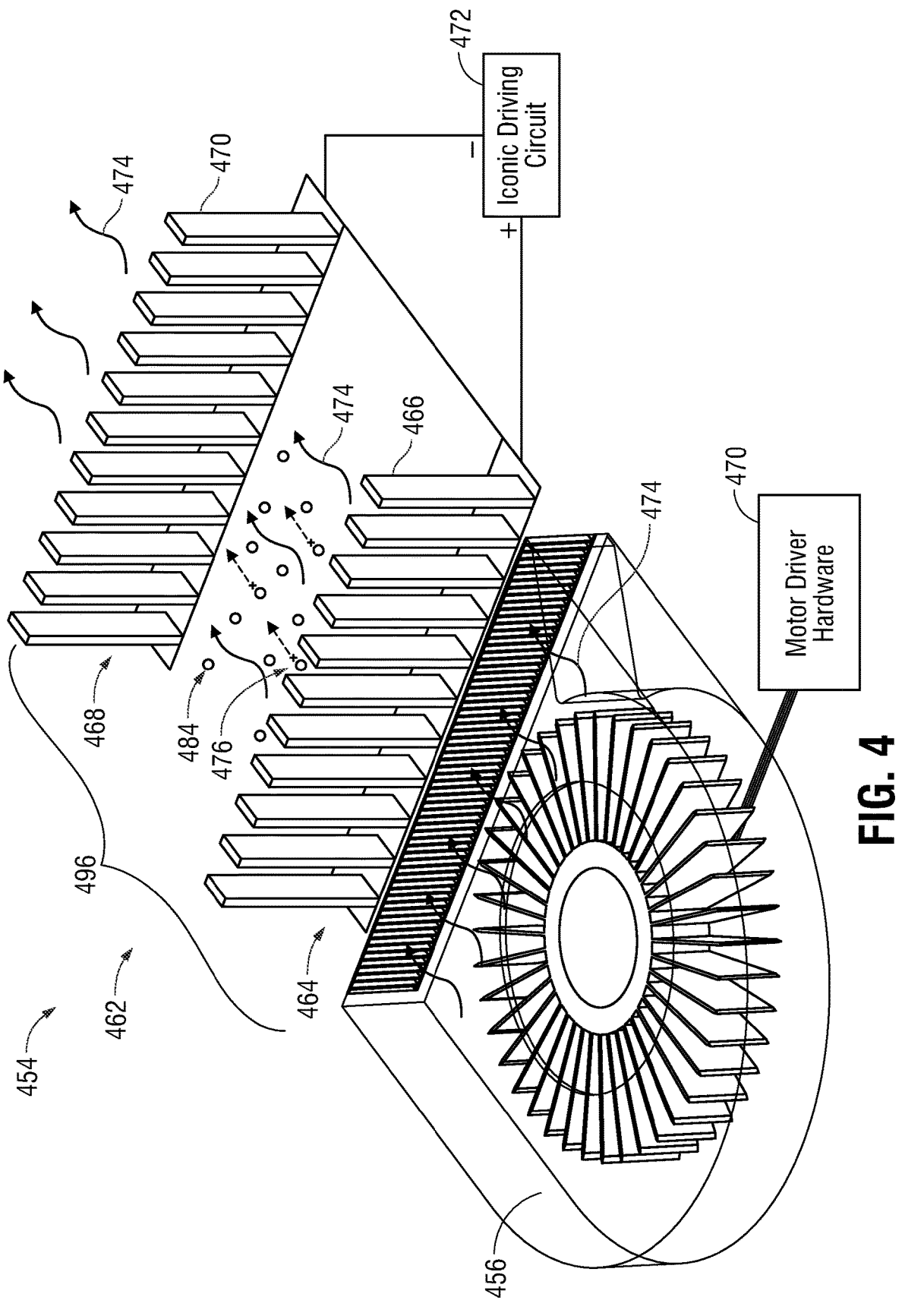
FIG. 4 is a graphic diagram perspective view of an ion emitter/collector blower including an ion emitter and ion collector as well as a cooling fan with a fan housing according to another embodiment of the present disclosure.

FIG. 4 is a graphic diagram perspective view of an ion emitter/collector blower and fan cooling system 454 including an ion emitter/collector blower 462 that comprises an ion emitter 464 and ion collector 468 as well as a fan housing 457 used to house a fan 456 according to another embodiment of the present disclosure. The ion emitter/collector blower 462 may be coupled within a chassis of the information handling system in an embodiment so that heat generated by the operation of the hardware (e.g., hardware processor, memory devices, PMU, CPU, etc.) may be directed out of the information handling system via an air exhaust vent formed in the chassis (e.g., at a top side surface of the base chassis of the information handling system). As described herein, the arrangement of the ion emitter/collector blower 462 relative to the fan housing 457 and fan is shown in FIG. 4 with the fan impeller within the fan housing 457 being removed to show the relative position over an air intake vent (not shown). As such, the ion emitter/collector blower 462 may be placed in series with the fan and fan housing 457 so that the velocity of the airflow 474 may be increased as it passes through the fan housing 457 and the ion emitter/collector blower 462. It is appreciated, however, that the ion emitter/collector blower 462 and cooling fan 456 are not placed in series and that these cooling systems may work independent of each other. For simplicity in description, the present specification describes the ion emitter/collector blower 462 being placed in series with the cooling fan 456. The present specification contemplates these other arrangements of the cooling fan relative to the ion emitter/collector blower, however.

The ion emitter/collector blower 462 may include an ion emitter/collector blower housing (not shown) used to house the components of the ion emitter/collector blower 462 described herein in an embodiment. However, FIG. 4 does not show the housing of the ion emitter/collector blower 462 so that the ion emitter 464 and ion collector 468 may be seen. In an alternative embodiment, the ion emitter/collector blower 462 does not include an ion emitter/collector blower housing and instead, those components of the ion emitter/collector blower are operatively coupled to the chassis of the information handling system. Again, as described herein, the fan housing 457 may be fluidically sealed to an air intake of the ion emitter/collector blower 462 in those embodiments where the ion emitter/collector blower and cooling fan are placed in series.

The ion emitter/collector blower and fan cooling system 454 includes the ion emitter/collector blower 462 with an ion emitter 464. In an embodiment, the ion emitter 464 includes a plurality of ion emitter blades 466 through which air may pass and which are used to create an airflow into, through, and out of the ion emitter/collector blower housing. The number of ion emitter blades 466 may vary in umber, size, or shape depending on an anticipated level of heat generation by the hardware components within the information handling system, or the shape and design of the ion emitter/collector blower housing or chassis of the information handling system, among other factors. Each of the ion emitter blades 466 are coupled to an electrode of a high voltage source of an ionic driving circuit 472. In an embodiment, each of the ion emitter blades 466 includes a blade edge. In one embodiment, the blade edges may be made to come to a sharp point in order to facilitate the creation of more ions 476. In an embodiment, the ion emitter 464 of the ion emitter/collector blower 462 and the emitter blades 466 may be made of a refractory metal such as niobium, chromium, molybdenum, tantalum, tungsten, and rhenium among others. In an embodiment, the portions of the ion emitter/collector blower 462, ion emitter 464, and ion emitter blades 466 may be electroplated with a refractory metal such as niobium, chromium, molybdenum, tantalum, tungsten, and rhenium among others with an interior layer of ion emitter 464 and ion emitter blades 466 being made of a conductive material such as iron. It is appreciated that the ion emitter blades 466 may be made of any alloy of metal that includes alloys of those refractory metals described herein.

The ion emitter/collector blower 462 also includes an ion collector 468 with a distance 496 between the ion emitter 464 and ion collector 468 across which ions 476 may generate airflow 474. In an embodiment, the ion collector 468 includes a plurality of ion collector blades 470 through which air may pass and which are used to deionize those ions 476 created at the ion emitter 464 as described herein. The number of ion collector blades 470 may vary depending on an anticipated level of heat generation by the hardware components within the information handling system, or the shape and design of the ion emitter/collector blower housing or housing of the information handling system, among other factors such as the creation of ions 476 at the ion emitter 464. Each of the ion collector blades 470 are coupled to an electrode of a high voltage source of an ionic driving circuit 472 in an embodiment. In an embodiment, the ion collector blades 470 are coupled to a grounding source used to prevent arcing between the ion emitter 464 and ion collector 468. In an embodiment, each of the ion collector blades 470 includes a blade edge. It is appreciated that the ion collector blades 470 may be made of any alloy of metal that includes alloys of those refractory metals described herein.

As described herein, the ion emitter 464 and its ion emitter blades 466 as well as the ion collector 468 and its ion collector blades 470 are electrically coupled to a high voltage source (e.g., 2 kV to 10 kV voltage source difference between the ion emitter 464 and the ion collector 468). In an embodiment, the ionic driving circuit 472 may include a boost converter that provides, for the high voltage source of the ionic driving circuit 472, those voltages described herein to the ion emitter 464 and ion collector 468. An electric field is created across the distance 496 between the ion emitter 464 and the ion collector 468.

As described in embodiments herein, the ion collector 468 and ion emitter 464 of the ion emitter/collector blower 462 may be operatively coupled to an ionic driving circuit 464. In an embodiment, the ionic driving circuit 472 is controlled via the processor, the PMU with a hardware controller, and EC 103, or a combination thereof. The ionic driving circuit 472, in an embodiment, includes a high voltage source that is operatively coupled to the ion emitter/collector blower 462. In an embodiment, the high voltage source may include a boost converter that steps up voltage from its input (e.g., a battery or AC power adapter) to the output at the ion emitter/collector blower 462. The high voltage source of the ionic driving circuit 472 causes the ion emitter 464 to emit ions 476 from the blade edges of each ion emitter blade 466. In the context of the present specification, the term "emit" or "emitter" is meant to describe an action and device that, at its edges or other surfaces, creates ions 476 and, via an electromagnetic repulsion, repels those ions 476 towards an attracting, oppositely charged source such as the ion collector 468 described herein. In an embodiment, the high voltage source of the ionic driving circuit 472 causes electrons to be ripped away from certain molecules such as gas molecules in the atmosphere thereby creating ions (e.g., positively-charged ions) at the edges or other surfaces of the ion emitter blades 466. This ionization process may include the removal of one or more electrons from the outer valence shells of the individual air molecules 494 within the gas such that they become positively charged (e.g., cations) in an embodiment. In an example where the interior of the ion emitter/collector blower housing includes atmospheric air, any number of types of air molecules 494 may be subjected to this process. For example, where the gas includes oxygen ($O_2$), the ionization of oxygen may include the removal of a single electron or two electrons from the oxygen molecule. This may lead to a $O_2^+$ or $O_2^{2+}$ ion (e.g., cation) being created by the ion emitter/collector blower 462 with the ionic driving circuit 472 in an embodiment. Other gas molecules or molecules within the atmosphere within the housing of the ion emitter/collector blower 462 may similarly be ionized such as nitrogen, carbon dioxide, argon, hydrogen, etc. to create other ions such as $N^{+1}$, $N^{+2}$, $N^{+3}$, $N^{+4}$, $N^{+5}$, $O_3$ (ozone), $H^{+1}$.

This ionization of the atmospheric gases within the ion emitter/collector blower 462 housing helps to create an airflow 474 within the ion emitter/collector blower 462 and its housing. In an embodiment, the movement of the ions 476 from the ion emitter 464 to the ion collector 468 creates a shearing force on the air (e.g., ions 476 drag non-ionized air molecules 494 and other ions 476) within the ion emitter/collector blower 462 housing across distance 496. This shearing force pulls the other air molecules 484 in the direction of the travel of the ions 476 created by the ion emitter/collector blower 462 with the electric field across distance 496 towards the ion collector 468 thereby creating this airflow 474. In an embodiment, the movement of the ions 476 (shown as positive ions indicated with a "+" sign) created and emitted from the ion emitter 464 may be from the ion emitter 464 to the ion collector 468. In an example embodiment, the ion emitter 464 may be operatively coupled to a positive electrode of the high voltage source of the ionic driving circuit 472. As a result of generating the positively charged ions 476, the charged ion emitter 464 now repels those positively charged ions 476 causing the charged ions 476 to be repelled away from the ion emitter 464, following the electric field created between the ion emitter 464 and ion collector 468 across distance 496, and attracted to the ion collector 468.

In an embodiment, the ion collector 468 is operatively coupled to a negative or opposite electrode of the high voltage source of the ionic driving circuit 472. In an embodiment, the ion collector 468 is operatively coupled to a grounding source or high voltage negative source of the ionic driving circuit 472. Whether the ion collector 468 is coupled to a negative electrode of the high voltage source or to ground of the high voltage source, the voltage difference between the ion emitter 464 and ion collector 468 as well as the distance 496 determines an electric field between the ion emitter 464 and the ion collector 468. The ions 476 created by the ion emitter 464 follow this electric field. In an embodiment where the ion collector 468 is operatively coupled to a negative electrode of the high voltage source and not ground, the ion collector 468 may be electrically insulated from the remaining portions of the ion emitter/collector blower and fan cooling system 454 and the housing of the ion emitter/collector blower 462 including the ion emitter 464. In an embodiment, this electrical isolation may be accomplished by making the ion emitter/collector blower 462 housing out of an electrically non-conductive material such as plastic. In an embodiment, the electrical isolation may be accomplished by placing an insulative gasket (not shown) between the ion collector 468 and the ion emitter/collector blower 462 housing and the ion emitter 464. The electrical isolation of the ion collector 468 allows for the electrical field between the ion emitter 464 and ion collector 468 to be formed allowing for an electrical field path for the ions 476 to follow.

In an embodiment, the creation of the electric field between the ion emitter 464 and ion collector 468 causes the positively-charged ions 476 created by the ion emitter 464 to be attracted to the negatively charged ion collector 468 further causing movement of the ions 476 and creating an airflow 474 within the ion emitter/collector blower 462 housing as described. As the positively-charged ions 476 reach the ion collector 468, those missing valence electrons stripped away by the ion emitter 464 at the ions 476 may be added to a valence shell of the ionized air molecules 494 placing those ions 476 at a neutral electrical charge again. Following the example of the ionization of the oxygen molecules in the air molecules 494 within ion emitter/collector blower 462 housing by the ion emitter 464, as these $O^+$ or $O^{2+}$ ions 476 (e.g., cations) have their extraneous electrons returned from at their valence electron shells (e.g., a single electron or two electrons, respectively) the oxygen molecules are placed in an electrically neutral state.

The creation of this airflow 474 via the ionic movement of the ions 476 created by the ion emitter 464 has a low-pressure head of around 0.04 to 0.05 inches of $H_2O$ (water column) as compared to the rotation of a fan or blower that may have a pressure head of around 0.5 inches of $H_2O$ in one example embodiment. However, the flow rate of air into and out of the ion emitter/collector blower 462 via operation of the ion emitter 464 and ion collector 468 creating ions 476 is relatively higher than the potential flow rate of air created by the rotation of a fan alone. By imparting relatively high airflow rate with lower pressure head, the acoustics of the ion emitter/collector blower and fan cooling system 454 can be reduced over time by reducing fan speed used or during episodes when the cooling fan may be turned off because the ion emitter/collector blower is silent or near silent in an embodiment. Thus, the fan speed may be reduced for the same airflow levels of a faster rotating fan in an example embodiment. Further, placement of the ion emitter/collector blower and fan cooling system 454 in a chassis of an information handling system with a lower air intake vent 482 and a higher exhaust vent (not shown) proximate to the ion emitter/collector blower and fan cooling system 454, the airflow 474 may also be enhanced by convection due to a chimney effect through the information handling system chassis.

In an embodiment, the airflow 474 created by this movement of the ions 476 may supplement the airflow 474 created via the rotation of a fan formed within the fan housing 457 or activation of a blower. As such, in an embodiment, the rotation of the fan may be reduced in speed or stopped for various episodes as compared to other fans that do not operate alongside an ion emitter/collector blower 462 in other information handling systems. Because the movement of the ions 476 creates an airflow 474, in some embodiments the rotation of the fan may be stopped by the contextual cooling device switching system depending on contextual inputs and allowing the cooling of the hardware within the housing of the information handling system by the ion emitter/collector blower 462 to be accomplished via the airflow 474 created by the creation of the ions 476 by the ion emitter 464. In some embodiments where the heat of the hardware within the housing of the information handling system increases, the hardware processor executing code instructions of the ion emitter/collector blower and fan cooling system and contextual cooling device switching system may direct motor driver hardware to drive a fan motor to turn the fan so that the additional airflow 474 created by the rotation of the fan blades increases the speed of the airflow 474 further depending on contextual inputs according to embodiments herein. This allows the noises associated with the rotation of the fan to be reduced or even eliminated during relatively cool temperatures within the housing of the information handling system by the contextual cooling device switching system depending on contextual inputs and thereby often decreasing the noise heard by the user of the information handling system. As a result, in an embodiment, the ion emitter/collector blower and fan cooling system 454 described herein may have a noiseless base capability of cooling the information handling system with a backup cooling system via actuation of a fan motor to rotate the fan blades under control of executing code instructions of the ion emitter/collector blower and fan cooling system with the contextual cooling device switching system as described herein. This may further increase the user satisfaction of the information handling system by reduction of unnecessary fan noise with the contextual cooling device switching system during operation of the information handling system by decreasing typical fan noise heard by the user.

It is appreciated that, in an embodiment, a positive electrode of the high voltage source of the ionic driving circuit 472 may be operatively coupled to the ion collector 468 structure with the negative electrode of the high voltage source operatively coupled to the ion emitter 464 structure so the airflow 474 is reversed. In this example embodiment, the ion collector 468 structure of the ion emitter/collector blower 462 may strip electrons from the air molecules 494 creating a positively-charged ions 476 (e.g., cations) whereby the ion collector 468 structure operates, even temporarily, as an ion emitter. This allows the airflow 474 created by the shearing force of the created ions 476 to be reversed in an opposite direction than that shown in FIG. 4. In an embodiment, this may be done so that any dust or debris collecting within the ion emitter/collector blower 462 housing, or the base chassis of the information handling system may be dislodged. Because the fan is placed at an air intake vent 482, any dust or debris collected via this reversed airflow 474 may be passed out of the housing of the information handling system via this air intake vent 482. The ionic driving circuit 472 may, therefore, selectively reverse the operatively connection of the electrodes to the ion emitter 464 and ion collector 468 to change the direction of airflow 474 as described in order to perform this internal cleaning process.

As described herein, the contextual cooling device switching system may execute, with by a hardware processing device, computer-readable program code of the supervised binary or multi-level classification algorithm and maintained on non-volatile memory on the information handling system. In an embodiment, a plurality of sensors as described herein provide the contextual inputs under which the information handling system is being operated by the user and include the characterizing workload values used as input to the supervised binary or multi-level classification algorithm. The supervised binary or multi-level classification algorithm provides, as output, a decision that describes to the ion emitter/collector blower and fan cooling system when to initiate the cooling fan 456 and/or the ion emitter/collector blower 462 and how to operate those cooling devices.

For example, where a user prefers long battery runtime and is currently executing a videoconference application on the information handling system while drawing power from the battery, the supervised binary or multi-level classification algorithm may determine from input values reflecting this scenario operating the ion emitter/collector blower 462 without operating the cooling fan 456 would be the best solution. This is because the user needs a quiet environment to operate the information handling system based on the execution of the videoconferencing application (e.g., an input value indicating a type of application executing) and, based on the type of application being executed (e.g., the videoconferencing application), temperatures are unlikely to increase for beyond the capabilities of the ion emitter/collector blower 462 to cool the hardware within the housing of the information handling system. Again, the user may also provide operation preferences inputs, in an example embodiment, via a GUI presented to the user. For example, a GUI may be presented to a user that allows a user to select from a plurality of settings including settings associated with the execution of the contextual cooling device switching system by a hardware processor (e.g., an EC) as described herein. This GUI may allow a user to select from one of a plurality of operating modes in an embodiment.

In an example embodiment, operating modes may include a performance mode, a power mode, and a quiet mode. In the context of the present specification, a performance mode may be an operating mode under which the information handling system 300 prioritizes the performance of the information handling system 300 that includes prioritizing providing high power levels to maximize performance especially when executing program applications as the hardware processor associated with content creation versus noise generation, power levels, power consumption, and other input factors. In another example context of the present specification, a power mode may be selected as an operating mode under which the information handling system prioritizes limits on the power consumption by the hardware devices when, for example, the information handling system is operating on power provided by the battery. In yet another example the context of the present specification, a quiet mode may be an operating mode that prioritizes a reduction in noise such as produced via operation of the cooling fan over other operations such as processing and power resources. In an embodiment, the hardware processor may be used to detect and determine which of the operating modes are selected by the user. This data may be used as input to the supervised binary or multi-level classification algorithm to determine if the cooling fan 456 and/or ion emitter/collector blower 462 should be activated and whether to increase the voltage applied to the ion emitter to create more ions and/or increase the rotation speed of the cooling fan 456 as described herein.

In another use scenario of the information handling system by the user, where the information handling system is operatively coupled to a docking station and the imaging device does not detect the presence of the user, the execution of the supervised binary or multi-level classification algorithm by the contextual cooling device switching system may result in the contextual cooling device switching system, via a controller, to activate the ion emitter/collector blower 462 and the cooling fan 456 to maximize immediate cooling effect. This is because the noise associated with the operation of the cooling fan 456 is no longer a factor to consider (e.g., the user is away from the information handling system) and cooling of the system can be accomplished with no power drain on the battery because the information handling system is operatively coupled to an A/C power source (e.g., the A/C power adapter). The systems and methods described herein, therefore, may leverage user preference inputs as part of the input to the supervised binary or multi-level classification algorithm of the contextual cooling device switching system as well as detected context inputs and characterizing workload values that the information handling system is operating under in order to cool the hardware within the housing of the information handling system. For example, the contextual cooling device switching system may delay or accelerate timing of when or how to activate the cooling fan (e.g., speed of cooling fan) to maximize silent cooling time of the ion emitter/collector blower. This is done while maintaining relatively silent operation of the information handling system. This increases user satisfaction and increases the capabilities of the information handling system to maintain temperatures within the information handling system.

FIG. 5 is a flow diagram of a method of manufacture of an information handling system including an ion emitter/collector blower with a cooling fan operated via execution of a contextual cooling device switching system according to an embodiment of the present disclosure. The method 500 includes, at block 505, operatively coupling an ion emitter and an ion collector within an ion emitter/collector housing forming an ion emitter/collector blower. As described herein, the ion emitter described herein include a plurality of emitter blades through which air may pass and which are used to create an airflow into, through, and out of the ion emitter/collector blower housing of the ion emitter/collector blower. The number of emitter blades may vary depending on an anticipated level of heat generation by the hardware components within the information handling system, or the shape and design of the ion emitter/collector blower housing or chassis of the information handling system, among other factors described herein. Each of the emitter blades, as described herein, are coupled to an electrode of a high voltage source of an ionic driving circuit during operation of the ion emitter/collector blower. In an embodiment, each of the emitter blades includes a blade edge. In one embodiment, the blade edges may be made to come to a sharp point in order to facilitate the creation of more ions during operation of the ion emitter/collector blower. In an embodiment, the ion emitter of the ion emitter/collector blower and the emitter blades may be made of a refractory metal such as niobium, chromium, molybdenum, tantalum, tungsten, and rhenium among others. In an embodiment, the portions of the ion emitter/collector blower cooling system and emitter blades may be electroplated with a refractory metal such as niobium, chromium, molybdenum, tantalum, tungsten, and rhenium among others with an interior layer of the ion emitter/collector blower cooling system and emitter blades being made of a conductive material such as iron. It is appreciated that the emitter blades may be made of any alloy of metal that includes alloys of those refractory metals described herein.

The ion emitter/collector blower cooling system also includes an ion collector with a distance between the ion emitter and ion collector across which ions may generate airflow. In an embodiment, the ion collector includes a plurality of collector blades through which air may pass and which are used to deionize those ions created at the ion emitter as described herein. The number of collector blades may vary depending on an anticipated level of heat generation by the hardware components within the information handling system, or the shape and design of the ion emitter/collector blower housing or housing of the information handling system, among other factors such as the creation of ions at the ion emitter during operation of the ion emitter/collector blower. Each of the collector blades are coupled to an electrode of a high voltage source of an ionic driving circuit in an embodiment. In an embodiment, the collector blades are coupled to a grounding source used to prevent arcing between the first ion emitter and first ion collector. In an embodiment, each of the collector blades includes a blade edge. It is appreciated that the collector blades may be made of any alloy of metal that includes alloys of those refractory metals described herein.

The method 500 includes, at block 510, operatively coupling a set of fan blades of an impeller within a fan housing to form a cooling fan. As described herein, the fan may include a fan housing that houses a series of fan blades that are operatively coupled to a fan motor. In an embodiment the fan blades of the impeller may include a plurality of blades that are formed together at a central hub. This central hub of the impeller may be operatively coupled to a shaft of the fan motor so that the rotation of the shaft will impart a rotation of the fan blades and central hub during operation of the fan described herein.

The method 500 further includes, at block 515, operatively coupling the ion emitter/collector blower to a back chassis of an information handling system and above an air inlet vent formed through the back chassis of the housing of the information handling system. In an embodiment, the ion emitter/collector blower may be placed within the back chassis of the information handling system at a location vertically above the air intake vent such that enough space is available for a fan and its fan housing to be placed over this air intake vent in the back cover. In an embodiment, the ion emitter/collector blower may be placed a distance away from a top side wall of the housing of the information handling system where one or more air exhaust vents are formed. The placement of the ion emitter/collector blower a distance from away form a top side wall allows for heat generating components or other passive heat conducting devices to be placed between the ion emitter/collector blower and the air exhaust vents.

The method 500 further includes, at block 520, operatively coupling the fan over the inlet vent and couple an output of the fan to an inlet of the ion emitter/collector blower. In some embodiments, the coupling of the fan output to the inlet of the ion emitter/collector blower may be sealed. In an embodiment, the output of the fan is sealed against the input of the ion emitter/collector blower so that air passing from the housing of the fan may pass directly into the inlet of the ion emitter/collector blower. In an embodiment, the housing at the air output of the fan may be similarly sized to the air intake of the ion emitter/collector blower. In an embodiment, the sealing of the output of the fan is against the input of the ion emitter/collector blower may be conducted prior to either the ion emitter/collector blower or fan being operatively coupled to the back chassis of the information handling system.

The hardware processor of the information handling system, in an example embodiment, may be placed vertically or at the same level or higher than the fan and/or ion emitter/ collector blower. The placement of the hardware processor or other heat generating hardware component above the fan and/or ion emitter/collector blower allows for the operation of the fan and ion emitter/collector blower to clear air generated by the heat generating device from the chassis area where that heat generating device is located. Further, the location of the inlet vents, the fan, the ion emitter/collector blower, and the outlet exhaust vents may provide for a chimney effect. The chimney effect, in the present specification, pulls air into the housing of the information handling system via the air intake vent and out of the housing via an air exhaust vent located at an upper location due to the differences in air buoyancy between the air inside the housing of the information handling system and the air outside of the information handling system for convection-assisted airflow which may further assist the active cooling structures of the ion emitter/collector blower and fan cooling system. With the in-series fan and ion emitter/collector blower, when the air within the housing of the information handling system is heated due to the operation of the heat-generating hardware components, cool air is pulled into the housing and accelerated through the housing via operation of the fan and ion emitter/collector blower. Control of the fan and the ion emitter/collector blower provides for control of the amount of cold air drawn into and heated air passed out of the housing of the information handling system during operation of the information handling system according to embodiments herein.

The method 500 further includes, at block 525, operatively coupling the ion emitter and ion collector of the ion emitter/collector blower to an ionic driving circuit within the housing of the information handling system. As described herein, the ion emitters include a plurality of emitter blades through which air may pass and which are used to create an airflow into, through, and out of the ion emitter/collector blowers as described. Each of the emitter blades are coupled to an electrode of a high voltage source of an ionic driving circuit. In an embodiment, each of the emitter blades includes a blade edge. In one embodiment, the blade edges may be made to come to a sharp point in order to facilitate the creation of more ions during operation of the ion emitter/collector blower.

Additionally, the ion collectors include a plurality of collector blades through which air may pass and which are used to deionize those ions created at the ion emitter as described herein. Each of the collector blades are coupled to an electrode of a high voltage source of an ionic driving circuit in an embodiment. In an embodiment, the collector blades are coupled to a grounding source used to prevent arcing between the ion emitter and ion collector. In an embodiment, each of the collector blades includes a blade edge. It is appreciated that the ion collector blades may be made of any alloy of metal that includes alloys of those refractory metals described herein.

As described herein, the ion emitter and its blades as well as the ion collector and its blades are electrically coupled to a high voltage source (e.g., 2 kV to 10 kV voltage source difference between the ion emitter and the ion collector). In an embodiment, the ionic driving circuit may include a boost converter that provides, for the high voltage source of the ionic driving circuit, those voltages described herein to the ion emitter and ion collector.

The method 500 further includes, at block 530, operatively coupling a fan motor of the fan to a motor driver hardware. As described herein, a processor, an EC 103, or other hardware processor may direct a motor driver hardware to drive the fan motor to turn the fan so that the additional airflow created by the rotation of the fan blades may increase the velocity of the airflow further into the ion emitter/collector blower and out of the housing of the information handling system during operation.

At block 535, a PMU is operatively coupled to the ionic driving circuit. The PMU may provide power to the ionic driving circuit so that the voltages necessary to create ions at the ion emitter can be provided to the ion emitter during operation of the information handling system and the ion emitter/collector blower. In an embodiment, a hardware PMU controller, a hardware processor, and/or an EC 103 may be operatively coupled to the ionic driving circuit to control the levels of voltages applied to the ion emitters and ion controllers as described herein.

At block 535, a hardware processing device is operatively coupled to a hardware processing device to an ion emitter/collector blower and fan cooling system that includes the ion emitter/collector blower and the cooling fan. Additionally, at block 535, the hardware processing device is operatively coupled to a non-volatile memory device and upload a trained supervised binary or multi-level classification algorithm of a contextual cooling device switching system. The hardware processing device may include a plurality of hardware processing devices such as a CPU, an EC, and a GPU among other types of hardware processing devices. In an example embodiment, the hardware processing device is an EC that operates the contextual cooling device switching system and the ion emitter/collector blower and fan cooling system as described herein so that other processing resources (e.g., a CPU or GPU) can be used to execute other computer-readable program code such as the OS and specific applications (e.g., videoconferencing applications, gaming applications, word processing applications, etc.).

As described herein, the computer-readable program code of the contextual cooling device switching system and its supervised binary or multi-level classification algorithm are executed, during operation of the information handling system, in order to determine if and when the cooling fan, the ion emitter/collector blower, or both are activated to create an airflow through the housing of the information handling system. In an embodiment, the contextual cooling device switching system may execute the supervised binary or multi-level classification algorithm to control whether to initiate the cooling fan and/or ion emitter/collector blower as well as whether to increase or decrease their respective capabilities to create an airflow as described herein.

At block 540, the method 500 includes operatively coupling the PMU to an embedded controller (e.g., hardware embedded controller) or other hardware processing device. In other embodiments, different or a combination of a plurality of hardware processing devices may be used to operate the PMU. As described herein, the PMU may also be operatively coupled to the ionic driving circuit, at block 540, in order to control the ion emitter/collector blower and fan cooling system including driving of the ion emitter/collector blower per instructions received from the contextual cooling device switching system. At block 545, the method 500 includes downloading a self-driving cooling system reinforcement learning agent and ion emitter/collector blower and fan control system software code to storage memory for execution via a hardware processor. This download process may be conducted via a wireless connection to a wireless network.

The method 500 includes, at block 545, enclosing the housing of the information handling system by coupling a front cover/display device to the back chassis of the information handling system. In an embodiment, the front cover/ display of the information handling system may be a touch display device that also or alternatively allows the user to provide input to the information handling system. As described herein, the information handling system includes the back cover and front cover/display and may, in an example embodiment, form a tablet-type or two-in-one information handling system. In an embodiment, the back cover and front cover/display may be used to house a processor at the processor location as well as one or more ion emitter/collector blower cooling systems at an ion emitter/collector blower cooling system location. Other hardware components such as a battery and other memory devices (e.g., volatile or non-volatile memory devices) are also housed within the housing of the information handling system. The front cover/display, as described herein, includes a front cover/display that serves both to cover this hardware as well as an input and output device via the touch screen video display device as described herein. At this point, the method 500 may end.

Figure 6:
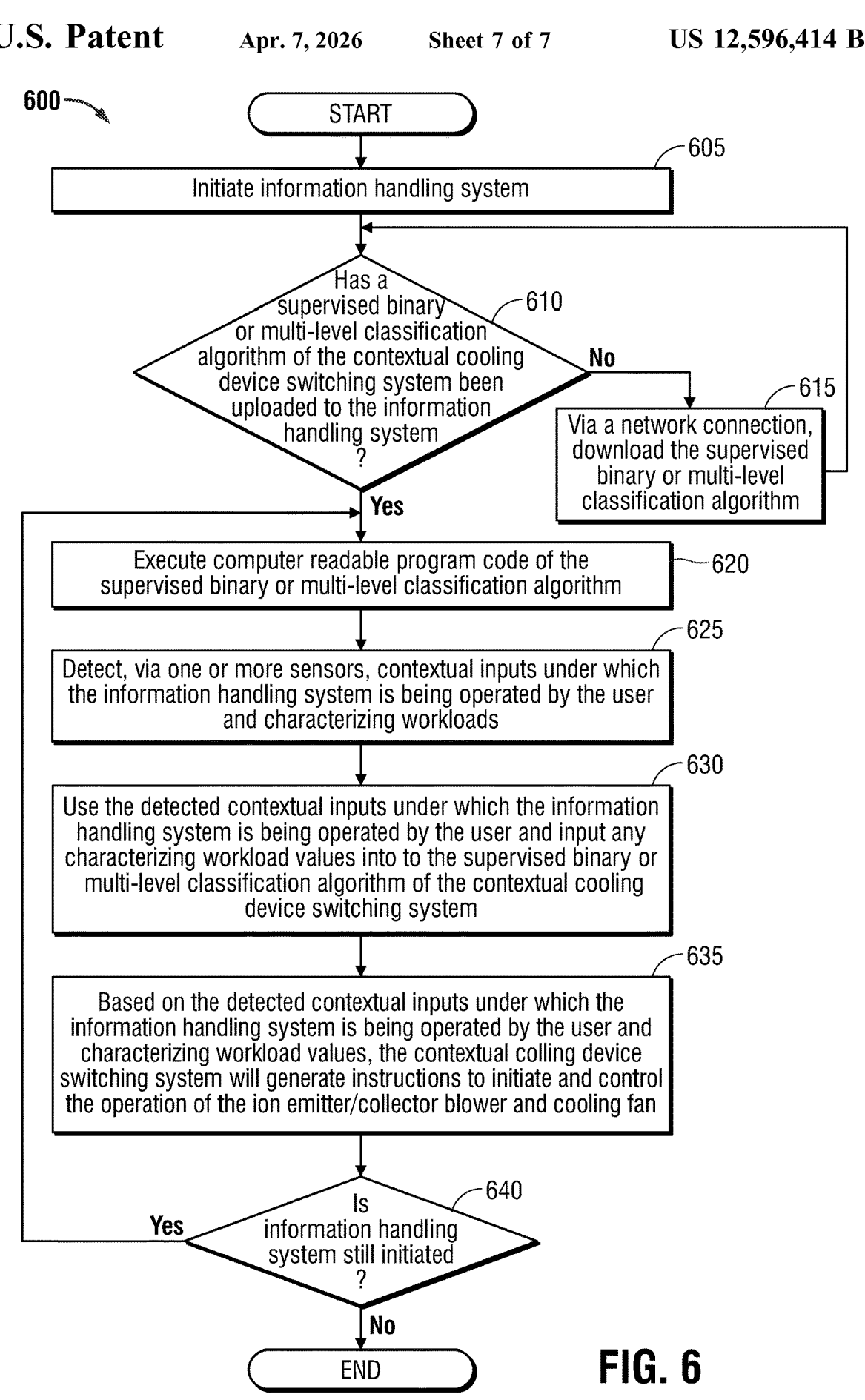
FIG. 6 is a flow diagram of a method of controlling the activation of an ion emitter/collector blower and/or a cooling fan via execution of a contextual cooling device switching system including a supervised binary or multi-level classification algorithm according to an embodiment of the present disclosure.

FIG. 6 is a flow diagram of a method 600 of controlling the activation of an ion emitter/collector blower and/or a cooling fan via execution of a contextual cooling device switching system including a supervised binary or multi-level classification algorithm by an embedded controller or other hardware processing resource according to an embodiment of the present disclosure. The method 600 describes the operation of the contextual cooling device switching system and its supervised binary or multi-level classification algorithm described herein in order to control of the operation of the ion emitter/collector blower and cooling fan, or both, of the ion emitter/collector blower and fan cooling system described herein. The systems described here allow for data inputs describing a context under which the information handling system is being operated by the user and use of characterizing workload values as inputs to the contextual cooling device switch system code instructions to direct the operation of the ion emitter/collector blower and fan cooling system.

The method 600 includes, at block 605, with initiating the information handling system. This initiation process at block 605 may be conducted by the user actuating, for example, a power button key on the information handling system. The actuation of this power button may cause the execution of a native BIOS, a native OS, or other code instructions used and executed by the processor of the information handling system to operate the hardware within the information handling system including the ion emitter fan cooling system described herein.

The initiation of the information handling system by the user causes the BIOS and/or OS to execute, via a hardware embedded controller or other hardware processing device, cause instructions of the supervised binary or multi-level classification algorithm or another machine learning algorithm used with the contextual cooling device switching system described herein. In an embodiment, the supervised binary or multi-level classification algorithm or another machine learning algorithm may have been uploaded to a non-volatile memory device by the manufacturer. However, in some example embodiments, the supervised binary or multi-level classification algorithm may not be uploaded or may need to be updated with a newly trained supervised binary or multi-level classification algorithm. Where the contextual cooling device switching system does not include a trained supervised binary or multi-level classification algorithm or an updated trained supervised binary or multi-level classification algorithm, the method 600 includes, at block 615, downloading the trained supervised binary or multi-level classification algorithm. The method 600 then returns to block 610 with the determination if supervised binary or multi-level classification algorithm is present. Where the supervised binary or multi-level classification algorithm is present at block 610 or it is determined that another machine learning algorithm was downloaded, the method 600 continues to block 620. It is appreciated that, in an example embodiment, the supervised binary or multi-level classification algorithm may be previously trained by a manufacturer based on various contextual inputs for a model of information handling system.

At block 620 the method 600 continues with executing the computer readable program code of the contextual cooling device switching system that includes the supervised binary or multi-level classification algorithm. This execution of the contextual cooling device switching system causes, at block 625, the hardware embedded controller or other hardware processing device to begin to detect, via one or more sensors, one or more contextual inputs under which the information handling system is being operated by the user to obtain characterizing workload values input into the trained supervised binary or multi-level classification algorithm.

In an embodiment, one contextual input under which the information handling system is being operated by the user may include data describing a location of the information handling system and, accordingly, the user. This contextual input data may describe whether the use is within a building, a specific room, a conference room, a public location, and the like. As described herein, one or more sensors may be used to detect where the user and the information handling system is located. One of these sensors includes wireless network interface device hardware to determine location relative to one or more access points or base stations that provides signal triangulation data, and other location data that describes the location of the information handling system. Another sensor may include GPS system for GPS location data that describes the location of the information handling system. Still further, the sensors may include an imaging device used to detect whether the user is present in front of the information handling system. This contextual input data may be used, in an example embodiment, as input to a supervised binary or multi-level classification algorithm of during execution of the contextual cooling device switching system. The supervised binary or multi-level classification algorithm may use this contextual input data to determine, in some examples, an ozone level limits that are acceptable at or near the user and the information handling system that could affect the user's health in situations where the user is indoors for example. As described herein, the ionization process at the ion emitter may include the removal of one or more electrons from the outer valence shells of the individual molecules within the gas such that they become positively charged (e.g., cation). In an example where the space between the ion emitter and ion collector includes atmospheric air, any number of types of gas molecules may be subjected to this process. For example, where the gas includes oxygen (O), the ionization of oxygen may include stripping an electron from molecules and forcing the removal of a single electron or a plurality of electrons from the oxygen molecule or molecule. This may lead to a $O^+$ or $O^{2+}$ ion (e.g., cation) being created by the ion emitter and ionic driving circuit in an embodiment. It is appreciated that this ionization process may also cause ozone to be created. In this example embodiment, a single ionized oxygen molecule ($O_2$) may be attracted to and combine with an oxygen molecule ($O_2$) to form an ozone molecule ($O_3$). This ozone molecule has a slightly positive dipole moment causing the ozone molecule to be repelled from the ion emitter and attracted to the ion collector. In an embodiment, the ion collector may be in the form of a thermal fin set that allows the airflow to pass through the ion collector and out of the ion emitter/collector blower and, further out of a housing of the information handling system via, for example, and exhaust vent. As a result of the ion emitter creating ozone within the housing of the information handling system and using that ozone as an ion that creates a shear force on the other molecules in the atmosphere to create the airflow, some of this ozone may be accidentally expelled from the housing of the information handling system. In an embodiment, the ozone levels may meet or exceed safe ozone levels as set by, for example, a governmental entity such as the Occupational Safety and Health Administration (OSHA) in the United States and may depend on indoor or outdoor operation, size of a room, ventilation and other factors that increases or decreases accumulation or ozone. The execution of the supervised binary or multi-level classification algorithm by the contextual cooling device switching system, therefore, considers an estimated ozone production at the ion emitter/collector blower established, for example, with execution of code instructions of an intelligent ozone estimation and mitigation system operating according to embodiments herein. The ozone production estimation may factor static inputs such as construction and dimensions of the ion emitter/collector blower or the information handling system chassis or configurations as well as dynamic inputs such as the location of the information handling system (e.g., within a closed room or outside), and the presence of the user to determine whether and to what extent to operate the ion emitter/collector blower or to activate the cooling fan to cool the information handling system and disperses the ozone predicted to build up.

In an embodiment, contextual inputs under which the information handling system is being operated by the user may include a selection of one or more operating modes selected by a user via, for example, a GUI presented to the user on the video display device. In an example embodiment, operating modes may include a performance mode, a power mode, and a quiet mode. In the context of the present specification, a performance mode may be an operating mode under which the information handling system prioritizes the performance of the information handling system that includes prioritizing having higher power consumption limits to maximize performance especially when executing process-intensive program applications with the hardware processor associated with content creation or other process-intensive tasks (e.g., CAD processes, encoding, among others). In example embodiments, of the present specification, a power mode may be an operating mode under which the information handling system prioritizes limits on the power consumption by the hardware devices when, for example, the information handling system is operating on power provided by the battery that needs conservation. In example embodiments of the present specification, a quiet mode may be an operating mode that prioritizes a reduction in noise, such as that produced via operation of the cooling fan, over other operations such as intensive processing and power resource consuming functions. In an embodiment, the hardware processor may be used to detect and determine which of the operating modes are selected by the user as contextual input. Additionally, this contextual input data may be used as input to the supervised binary or multi-level classification algorithm to determine if the cooling fan and/or ion emitter/collector blower should be activated and when as well as whether to increase the rotation speed of the cooling fan and/or the voltage applied to the ion emitter to create more ions and to what levels as described herein.

In an embodiment, another contextual input under which the information handling system is being operated by the user includes an orientation of the information handling system. In the example embodiments where the information handling system is a laptop-type information handling system, the orientation may include a closed orientation, a laptop orientation, a tablet orientation, a dual tablet configuration, and a tent orientation. Where the information handling system is a tablet-type information handling system, an accelerometer may be used as a sensor to detect the orientation of the information handling system (e.g., propped up, laying flat, etc.) In an embodiment, the sensors used to detect the orientation of the information handling system may include accelerometers, hinge sensors (e.g., detecting an open, closed, or an intermittent position of the display chassis relative to the base chassis), and other positional sensors. In such embodiments, these different orientations may affect the cooling capacity of the information handling system and ventilation, as well as the accumulation of ozone at or near the user. These orientation sensor contextual inputs may vary from information handling system to information handling system based on the size and shape of the housings of the base portions and display portions of the information handling system and location of vents and the cooling fans or ion emitter/collector blowers. Still further, the orientation of the information handling system may affect the ability of the imaging device to detect the user. Still further, the orientation of the information handling system may affect the heat accumulated within the housing of the information handling system or affect the ability of the information handling system to dissipate heat and hardware components.

In an embodiment, another contextual input under which the information handling system is being operated by the user includes the detection of ambient noise at the information handling system. In an embodiment, a microphone associated with the information handling system or the imaging device may be used as one of the sensors to detect noises and determine whether those noises are ambient noise levels or, for example, the voice of the user. The noise level values may be used as contextual inputs and may affect whether the supervised binary or multi-level classification algorithm uses this contextual input data to determine whether to activate or deactivate the cooling fan that is relatively noisier than the ion emitter/collector blower.

As described, the supervised binary or multi-level classification algorithm may also use, as contextual inputs, data describing characterizing workload values of the hardware of the information handling system. This hardware includes the hardware processor or other processing devices, the battery, and one or more memory devices (e.g., main memory and static memory), among other hardware devices. For example, a characterizing workload value of a processing device may be defined by a dynamic tuning technology (DTT) setting values that includes, for one or more hardware processing devices, priority settings that may define which of the hardware processing devices are being prioritized in an operating mode, target power setting values that may define a target power setting for the hardware processing devices, throttle temperature setting values that may define a control point based on the temperature of the hardware processing devices and defines a temperature at which the operation of the hardware processing devices are to be throttled, and a hardware processing device throttle temperature setting that may define a control point based on the temperature of a voltage regulator used with the hardware processing devices.

The contextual input data describing characterizing workload values of the hardware of the information handling system may also include data describing the workload intensity of the hardware processing devices, the memory devices, data storage devices, and other hardware devices such as a GPU. These workload intensity values may be defined as idle, bursty, or turbo among other descriptions. For example, where the hardware processing devices are operating under a "bursty" workload intensity, the hardware processing devices may intermittently engage in high processing tasks and low processing tasks. In another example, where the hardware processing devices are operating under a "turbo" workload intensity, the hardware processing devices may engage in continuously high processing tasks.

The contextual input data describing characterizing workload values of the hardware of the information handling system may also include analytics of process-level activity that detects foreground processes and user activity at the information handling system. This contextual input data may include values descriptive of those hardware processes associated with the execution of software applications by the processing devices. For example, a foreground process may include the execution of a videoconferencing application, a web browsing application, a software development application, a computer-aided design (CAD) application, a word processing application, a video processing application, and the like. It is appreciated that the execution of these different applications will require various levels of processing resources, data storage resources, power resources, among other types of resources to operate. Inferences may be made as well to develop a predictive application workload persona value that describes, when certain applications are executed, the required or anticipated requirements for processing, storage, and memory resources.

The contextual input data describing characterizing workload values of the hardware of the information handling system may further include battery telemetry that describes the use of battery power. This battery telemetry may describe a predictive battery usage persona value for a user based on if, when, and how often the user disconnects the information handling system from an A/C power source and uses the battery instead. These predictive battery usage persona value may describe the user as a heavy A/C power source user (e.g., termed a "corridor warrior") who sits at a cubicle most of the time, a user who discharges a significant amount of power from the battery before recharging the battery, whether the user uses the battery power during heavy processing, as well as other predictive battery usage persona values. Similarly, other power data may be used such as contextual input data describing whether the information handling system is operatively coupled to the A/C power adapter 124, the battery, a docking station that includes an A/C power source, or other configurable or reconfigurable power source (e.g., reconfigurable system-on-chip directing power consumption). This contextual input data may also be used as input to the supervised binary or multi-level classification algorithm 180 of the contextual cooling device switching system in order to determine the power requirements necessary to operate the cooling fan and/or ion emitter/collector blower and in light of the temperatures detected or predicted from heat generation within the housing of the information handling system.

It is appreciated that other contextual input data that affects the operation of the information handling system under a variety of use scenarios may also be used as input to the supervised binary or multi-level classification algorithm of the contextual cooling device switching system. The present specification contemplates the use of these different types of contextual input data in order to determine whether and when to initiate the cooling fan and/or the ion emitter/collector blower and if and how to control the speed of the cooling fan and the operation of the ion emitter/collector blower at various power levels as described herein. Such various contextual inputs and characterizing workload values as well as detected temperatures may be used by the contextual cooling device switching system in some embodiments to prioritize operation of the ion emitter/collector blower over initialization of the cooling fan when the supervised binary or multilevel classification algorithm or other trained machine learning algorithm would determine the information handling system is predicted to maintain stable temperatures within the information handling system housing without needed operation of the cooling fan. Alternatively, such contextual inputs and characterizing workload values may generate an instruction or classification yielding an instruction from the contextual cooling device switching system as to when a cooling fan may be required or used. Several such instructions or classifications may result to control when or how high to run the cooling fan with balancing noise restrictions if applicable from operation of the contextual cooling device switching system in various embodiments.

At block 630, the detected contextual inputs under which the information handling system is being operated by the user and characterizing workload values are used as input to the trained supervised binary or multi-level classification algorithm or other trained machine learning algorithm of the contextual cooling device switching system. Again, although the present specification describes specific contextual input data including that describing the characterizing workload values for the context under which the information handling system is being operated by the user, these are meant as examples and the present specification contemplates the use of other data that is used as contextual inputs for the supervised binary or multi-level classification algorithm.

The output from the execution of the binary or multi-level classification algorithm described herein, in an embodiment, may be used to minimize those noises produced by the operation of a cooling fan while also maximizing cooling depending on the dynamic contextual inputs described herein. The execution of the binary or multi-level classification algorithm also considers the contextual values in which the information handling system is operating under to determine opportunities or required periods of maximizing cooling capacity with operation and power levels for the ion emitter/collector blower as well as the cooling fan. Operation of the trained binary or multi-level classification algorithm or other machine learning algorithm of the contextual cooling device switching system may thus endeavor to minimize noise generation of the cooling system at time when appropriate or to improve the user experience by also dynamically predict and adjust operating conditions for control and effective cooling of the information handling system based on changing contextual inputs. The execution of the binary or multi-level classification algorithm also considers the contextual values in which the information handling system is operating under (e.g., location, user location relative to information handling system, accumulation of ozone) and, with those other contextual inputs, provide a safe ozone environment under which the user may operate the information handling system.

At block 635, the method 600 includes initiating and controlling the operation of the ion emitter/collector blower and cooling fan based on the detected context under which the information handling system is being operated by the user and characterizing workload values. The controlling of the ion emitter/collector blower and cooling fan may be completed via execution of the ion emitter/collector blower and fan cooling system via direction by the contextual cooling device switching system as described herein. A hardware controller, embedded controller, or other hardware processing device may execute computer-readable program code associated with the contextual cooling device switching system and ion emitter/collector blower and fan cooling system to control the operations of the cooling fan and ion emitter/collector blower in an embodiment.

At block 640, the method 600 includes determining if the information handling system is still initiated. Where the information handling system is still initiated, the method 600 includes executing those processes as described in block 620. Where the information handling system is no longer initiated (e.g., power has been removed from the information handling system via actuation of a power button), the method 600 may end here.

The blocks of the flow diagrams of FIGS. 5 and 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a hardware processor;
a memory device;

a power management unit (PMU) to provide power to the processor and memory device;

a cooling fan and fan motor operatively coupled to a fan motor driver hardware;

an ion emitter/collector blower, the ion emitter/collector blower including an ion emitter and an ion collector;

an ionic driving circuit operatively coupled to the ion emitter via a high voltage to ionize gases at the ion emitter/collector blower to create charged ions that generate an airflow along a voltage field to and through the ion collector; and a hardware embedded controller to execute code instructions of a contextual cooling device switching system, the contextual cooling device switching system operating the ion emitter/collector blower and cooling fan based on a plurality of contextual inputs including characterizing workload values under which the information handling system is being operated by a user and input into a trained machine learning algorithm to generate instructions when to activate ion emitter/collector blower and cooling fan and at airflow levels to operate the ion emitter/collector blower and cooling fan.

2. The information handling system of claim 1 further comprising:

the hardware embedded controller to execute the code instructions of the contextual cooling device switching system to prioritize the operation of the ion emitter/collector blower over initialization of the cooling fan when the contextual inputs including the characterizing workload values under which the information handling system is being operated by the user when the trained machine learning algorithm indicates that temperatures are predicted to be stable within a housing of the information handling system and the operation of the cooling fan is not needed.

3. The information handling system of claim 1 further comprising:

the embedded controller executing the contextual cooling device switching system includes the execution of a supervised binary or multi-level classification algorithm as the trained machine learning algorithm to receive, as input the characterizing workload values under which the information handling system is being operated by the user and provide, as output, the instructions of whether to activate the cooling fan, the ion emitter/collector blower cooling system, or a combination thereof.

4. The information handling system of claim 1 further comprising:

the hardware embedded controller to present to the user, via a video display device, a graphical user interface to receive an indication of the contextual input under which the information handling system is being operated by the user that includes selection of an operating mode that affects the activation of the cooling fan and ion emitter/collector blower cooling system.

5. The information handling system of claim 1 further comprising:

the hardware embedded controller to further detect an operating mode based on executing software applications, the operating mode including a performance mode requiring an increased level of processor resource utilization as contextual input into the trained machine learning algorithm to increase an operating capacity of the ion emitter/collector blower cooling system and to initiate the operation of the cooling fan.

6. The information handling system of claim 1 further comprising:

the contextual inputs under which the information handling system is being operated by the user including location data, detected user presence, orientation of the information handling system, and ambient noise levels detected.

7. The information handling system of claim 1 further comprising:

the characterizing workload values as contextual inputs including analytics of process-level data detecting foreground processes and user activity, telemetry associated with workload intensity of one or more processing devices, a workload type associated with the one or more processing devices, usage patterns of a battery of the information handling system, and detected context of applications executed on the information handling system.

8. An ion emitter/collector blower and fan cooling system for an information handling system comprising:

an ion emitter/collector blower, the ion emitter/collector blower including an ion emitter and an ion collector;

a cooling fan;

an ionic driving circuit operatively coupled to the ion emitter via a high voltage to ionize gases at the ion emitter/collector blower to create charged ions that generate an airflow along a voltage field to and through the ion collector;

a hardware embedded controller to execute code instructions of a contextual cooling device switching system with a trained supervised binary or multi-level classification algorithm, the contextual cooling device switching system operating the ion emitter/collector blower and fan based on contextual inputs under which the information handling system is being operated by the user and characterizing workload values input into the trained supervised binary or multi-level classification algorithm; and an output of the contextual cooling device switching system including instructions to provide power to the ionic driving circuit and fan motor driver hardware to control power level to the ionic driving circuit and a fan motor driver hardware.

9. The ion emitter/collector blower and fan cooling system of claim 8 further comprising:

the hardware embedded controller executing the code instructions of the contextual cooling device switching system to prioritize the operation of the ion emitter/collector blower over initialization of the fan when the contextual inputs under which the information handling system is being operated by the user includes characterizing workload values input into the trained supervised binary or multi-level classification algorithm indicating that temperatures are predicted to be stable within a housing of the information handling system and the operation of the fan is not needed.

10. The ion emitter/collector blower and fan cooling system of claim 8 further comprising:

the hardware embedded controller executing the contextual cooling device switching system includes the execution of the supervised binary or multi-level classification algorithm to provide, as output, the instructions to the ionic driving circuit and fan motor driver hardware determining whether to activate the fan, the ion emitter/collector blower cooling system, or a combination thereof.

11. The ion emitter/collector blower and fan cooling system of claim 10, further comprising:

the hardware embedded controller to present to the user, via a video display device, a graphical user interface to receive a mode selection value as the contextual input under which the information handling system is being operated by the user that includes an indication of selection of an operating mode that affects the activation of the fan and ion emitter/collector blower cooling system.

12. The ion emitter/collector blower and fan cooling system of claim 8 further comprising:

the hardware embedded controller to further detect an operating mode, the operating mode based on executing software applications including a performance mode requiring an increased level of processor resource utilization as contextual input into the trained supervised binary or multi-level classification algorithm to increase an operating capacity of the ion emitter/collector blower cooling system and to initiate the operation of the fan.

13. The ion emitter/collector blower and fan cooling system of claim 8 further comprising:

the contextual inputs under which the information handling system is being operated by the user including location data, detected user presence, orientation of the information handling system, and ambient noise levels detected.

14. The ion emitter/collector blower and fan cooling system of claim 8 further comprising:

the characterizing workload values as contextual inputs including analytics of process-level data detecting foreground processes and user activity, telemetry associated with workload intensity of one or more processing devices, a workload type associated with the one or more processing devices, usage patterns of a battery of the information handling system, and detected context of applications executed on the information handling system.

15. An information handling system comprising:

a hardware processor;

a memory device;

a power management unit (PMU) to provide power to the processor and memory device;

a cooling fan and fan motor operatively coupled to a fan motor driver hardware;

an ion emitter/collector blower, the ion emitter/collector blower including an ion emitter and an ion collector placed in fluidic series with the cooling fan;

an ionic driving circuit operatively coupled to the ion emitter via a high voltage to ionize gases at the ion emitter/collector blower to create charged ions that generate an airflow along a voltage field to and through the ion collector; and a hardware embedded controller to execute code instructions of a contextual cooling device switching system, the contextual cooling device switching system operating the ion emitter/collector blower and cooling fan based on a plurality of contextual inputs including characterizing workload values under which the information handling system is being operated by a user that are input into a trained machine learning algorithm to generate instructions to control the ionic driving circuit and the fan motor driver hardware, wherein the embedded controller executes the code instructions of the contextual cooling device switching system to maintain a stable internal temperature of the information handling system while minimizing noise generated by operation of the cooling fan.

16. The information handling system of claim 15 further comprising:

the hardware embedded controller executing code instructions of the contextual cooling device switching system including the execution of a supervised binary or multi-level classification algorithm to receive, as contextual inputs the characterizing workload values and the context under which the information handling system is being operated by the user and provide, as output, a determination of whether to activate the cooling fan, the ion emitter/collector blower cooling system, or a combination thereof.

17. The information handling system of claim 16 further comprising:

the embedded controller to present to the user, via a video display device, a graphical user interface to receive an indication of the contextual input under which the information handling system is being operated by the user that includes selection of an operating mode that affects the activation of the cooling fan and ion emitter/collector blower cooling system.

18. The information handling system of claim 15 further comprising:

the hardware embedded controller to further detect an operating mode based on executing software applications, the operating mode including a performance mode requiring an increased level of processor resource utilization as contextual input into the trained machine learning algorithm to and increase an operating capacity of the ion emitter/collector blower cooling system and to initiate the operation of the cooling fan.

19. The information handling system of claim 15 further comprising:

the contextual inputs under which the information handling system is being operated by the user including location data, detected user presence, orientation of the information handling system, and ambient noise levels detected.

20. The information handling system of claim 19 further comprising:

the characterizing workload values as contextual inputs including analytics of process-level data detecting foreground processes and user activity, telemetry associated with workload intensity of one or more processing devices, a workload type associated with the one or more processing devices, usage patterns of a battery of the information handling system, and detected context of applications executed on the information handling system.

* * * * *